United States Patent
Fisher et al.

(10) Patent No.: US 9,912,857 B2
(45) Date of Patent: Mar. 6, 2018

(54) SYSTEM AND METHOD FOR CONTROLLING AN EQUIPMENT RELATED TO IMAGE CAPTURE

(71) Applicant: ANDRA MOTION TECHNOLOGIES INC., Dartmouth (CA)

(72) Inventors: Antony Fisher, Halifax (CA); Michael Macdonald, Dartmouth (CA); Julian Taylor, Halifax (CA); Jeffrey Levy, Dartmouth (CA)

(73) Assignee: Andra Motion Technologies Inc., Dartmouth (CA)

( * ) Notice: Subject to any disclaimer, the term of this patent is extended or adjusted under 35 U.S.C. 154(b) by 0 days.

(21) Appl. No.: 14/782,531

(22) PCT Filed: Apr. 4, 2014

(86) PCT No.: PCT/CA2014/050346
§ 371 (c)(1),
(2) Date: Oct. 5, 2015

(87) PCT Pub. No.: WO2014/161092
PCT Pub. Date: Oct. 9, 2014

(65) Prior Publication Data
US 2016/0050360 A1 Feb. 18, 2016

Related U.S. Application Data

(60) Provisional application No. 61/808,987, filed on Apr. 5, 2013.

(51) Int. Cl.
*H04N 5/225* (2006.01)
*H04N 5/232* (2006.01)
(Continued)

(52) U.S. Cl.
CPC ....... *H04N 5/23212* (2013.01); *G03B 17/561* (2013.01); *G03B 17/563* (2013.01);
(Continued)

(58) Field of Classification Search
None
See application file for complete search history.

(56) References Cited

U.S. PATENT DOCUMENTS 5,930,740 A 7/1999 Mathisen
8,049,658 B1 * 11/2011 Lagonik ............... G01C 21/005
342/118
(Continued)

FOREIGN PATENT DOCUMENTS

EP 2 479 993 A2 7/2012
JP 2008-011212 A 1/2008

OTHER PUBLICATIONS

PictorVision, "The Eclipse" (2014). Retrieved from the Internet at: URL:http://www.pictorvision.com/aerial-products/eclipse/.
(Continued)

*Primary Examiner* — Stephen Coleman
(74) *Attorney, Agent, or Firm* — Marshall, Gerstein & Borun LLP

(57) ABSTRACT

A method and system for controlling a setting of an equipment related to image capture comprises capturing position data and orientation data of a sensing device; determining position information of a region of interest (i.e. a node) to be treated by the equipment, relative to the position and orientation data of the sensing device; and outputting a control signal directed to the equipment, in order to control in real-time the setting of the equipment based on said position information of the region of interest.

26 Claims, 24 Drawing Sheets

(51) Int. Cl.
  *G03B 17/56* (2006.01)
  *G06T 7/521* (2017.01)
(52) U.S. Cl.
  CPC .............. *G06T 7/521* (2017.01); *H04N 5/232* (2013.01); *H04N 5/23216* (2013.01); *H04N 5/23222* (2013.01); *H04N 5/23296* (2013.01)

(56) References Cited

U.S. PATENT DOCUMENTS

| | | | |
|---|---|---|---|
| 8,448,056 | B2 | 5/2013 | Pulsipher et al. |
| 8,562,433 | B2 | 10/2013 | Marks et al. |
| 8,775,916 | B2 | 7/2014 | Pulsipher et al. |
| 8,888,593 | B2 | 11/2014 | Larsen et al. |
| 2002/0057217 | A1 | 5/2002 | Milnes et al. |
| 2002/0080257 | A1 | 6/2002 | Blank |
| 2005/0007553 | A1 | 1/2005 | Romanoff et al. |
| 2008/0312866 | A1 | 12/2008 | Shimomura et al. |
| 2010/0194879 | A1 | 8/2010 | Pasveer et al. |
| 2011/0043613 | A1* | 2/2011 | Rohaly ............... G06T 17/00 348/50 |
| 2011/0119640 | A1* | 5/2011 | Berkes ............... G06F 3/011 715/863 |
| 2012/0159290 | A1 | 6/2012 | Pulsipher et al. |
| 2013/0188067 | A1 | 7/2013 | Koivukangas et al. |
| 2013/0222565 | A1 | 8/2013 | Guerin et al. |
| 2013/0229528 | A1 | 9/2013 | Taylor et al. |
| 2013/0324254 | A1 | 12/2013 | Huang et al. |

OTHER PUBLICATIONS

International Search Report and Written Opinion for Application No. PCT/CA2014/050346, dated Jul. 3, 2014.
CMotion GMBH, "Lens Control Systems", 2015, https://www.cmotion.eu/shop/welcome.
Cinematography Electronics Inc., California, USA, Copyright 2002-2014, http://www.cinemaelec.com/index.php.
Cooke Optics Limited, "I Technology", United Kingdom, Copyright 2012-2016, http://www.cookeoptics.com/cooke.nsf/products/itech.html.
Redrockmicro, "The Professional Remote Focus for Everyone 4.0", Texas, http://store.redrockmicro.com/microRemote.html.
Thimothy N. Hay and Stephan Weiss, "Design and Implementation of an Automatic Followspot Tracking System", University of Southampton, United Kingdom, http://eprints.soton.ac.uk/260038/1/spot.pdf.
Easy Focus, "The Ultimate Focus System EZ2", Austria, http://moviecam-easyfocus.com/.
Pictorvision, "The Eclipse", Copyright 2014, http://www.pictorvision.com/aerial-products/eclipse/.
3ALITY Technica,—stereo rigs that allow for pulling of converge and interocular, usually used in conduction with c motion remotes and hyden motors—this can be done non image based by using focus node as converge pull automation-, California, USA, Copyright 2014, http://www.3alitytechnica.com/aboutus.php.
Arri Ag., "Lens Data System LDS", Copyright 2016, https://www.arri.com/camera/alexa/learn/lens_data_system/.
Arri AG., "Wireless Compact Unit WCU-4", Copyright 2016, https://www.arri.com/camera/pro_camera_accessories_electronic_control_system/products/hand_units/wireless_compact_unit_wcu-4/?node_id=56180ddc98f4880546225a21.
Technologies for Worship, (another ultrasound spotlight tracking system) Copyright 2013, http://tfwm.com/news-0310precision (page not found).
The Matrix and Quaternions FAQ, "Q36", Version 1.4, Dec. 26, 1998, http://flipcode.com/documents/matrfaq.html#Q36.

* cited by examiner

Fixed or telescoping rod
Source                                                      Source Mounting Shaft          Mounting Hole

FIG. 5B                 FIG. 5C

→Mounting holes

Case with mounting holes, enclosing source

FIG. 8

Exemple Node Array

Exemple Node

Example selected
node with associated
sensor info

SYSTEM AND METHOD FOR CONTROLLING AN EQUIPMENT RELATED TO IMAGE CAPTURE

FIELD

The present invention relates to the field of motion tracking in camera-use environments. More particularly, the present invention relates to a system and method for controlling a setting of a camera or related equipment.

BACKGROUND

In camera environments (e.g. film, television, live entertainment, sports), a large variety of equipment exists to operate the functionalities of cameras, lighting, and sound. The control and interrelations of these functions determines the qualities of the final imagery and sound perceived by audiences. One such function is camera focus. "Pulling focus" or "rack focusing" refers to the act of changing the lens's focus distance setting in correspondence to a moving subject's physical distance from the focal plane. For example, if an actor moves from 8 meters away from the focal plane to 3 meters away from the focal plane within a shot, the focus puller will change the distance setting on the lens during the take in precise correspondence to the changing position of the actor. Additionally, the focus puller may shift focus from one subject to another within the frame, as dictated by the specific aesthetic requirements of the composition.

This process of adjusting the focus is performed manually by the "First Assistant Camera" (first AC) or "Focus Puller".

Depending on the parameters of a given shot, there is often very little room for error. As such, the role of a focus puller is extremely important within the realm of a film production; a "soft" image will, in most circumstances, be considered unusable, since there is no way to fix such an error in post-production. One must also consider that an actor may not be able to duplicate his or her best performance in a subsequent take, so the focus puller is expected to perform flawlessly on every take. Because of these factors, some production personnel consider the focus puller to have the most difficult job on set.

Though Focus Pullers can be very skilled, the current process still slows down production due to the complexity and difficulty of the task.

Current film production begins with a blocking rehearsal, in which the various actors' positions are established. During the rehearsal, a camera assistant lays tape marks on the floor at all points where an actor pauses in movement. The actors then leave set to go through hair and makeup, and stand-ins come in to take their places at these various positions for the purposes of lighting, framing, and focus-mark setting.

Once a camera position is established by the director of photography and camera operator, the first AC begins to measure the various distances between the actors' marks and the focal plane of the camera. These distances are recorded in a series of grease pencil/pen marks on the focus barrel of the lens, and/or the marking disc on the follow focus device. Using the stand-ins the marks are checked through the viewfinder and/or the onboard monitor for accuracy. If marks are repositioned in order to provide specific framing desired, the first AC must re-measure/re-set his marks accordingly. Additionally, the first AC may lay down specific distance marks on the floor which will be referenced during the take as actors move between their marks, in order to assist in accurately adjusting the focus to the correct intermediate distances.

When the actors return to set, there is usually a rehearsal for camera in which the focus puller and operator will practice the shot and make sure everything has been set up properly. During a take, the focus puller modifies the focus based on the dialog, movement of the actors or subject, movement of the camera and compensates on the fly for actors missing their marks or any unforeseen movement. In cases where an obstruction prevents the focus puller from seeing all his marks, he may request the second AC to call the marks for him over a 2-way radio during the shot. In some situations, such as on long lenses, wide apertures, very close distances, or any combination of the three, a subject moving even a few millimeters may require immediate and very precise focus correction.

After a take, if the focus puller feels he's made a mistake—be it a timing error, a missed mark, or any other issue which may have rendered some part of the take "soft", he or she will typically report this to the operator (who most likely noticed the error in the viewfinder) or director of photography, and may ask for another take if another wasn't already planned.

In addition to keen eyesight, reflexes, and intuition, the focus puller's primary tools are a cloth or fiberglass tape measure, steel tape measure, laser rangefinder, and in some cases an on-camera ultrasonic rangefinder which provides a real-time distance readout mounted on the side of the mattebox or camera body. In setups where the focus puller cannot touch the camera, such as on steadicam or crane shots, he or she will use a remote follow focus system, though some focus pullers prefer using a remote system at all times. In any of the above mentioned cases the focus puller is still required to adjust the focus manually during the course of the shot.

The current approach is time consuming, difficult, and highly prone to error. It has long been a technical hurdle in cinematic moving image production and it imposes significant creative constraints on the director as well as increasing the cost of production due to unusable shots, slow setup times and the need for highly skilled and highly paid focus pullers.

Known to the Applicant are semi-automatic focusing systems that depend on lasers, sonar, and facial/object recognition tracking.

These methods are essentially variances of the same approach in that they each sense the "two dimensional plane" of the image and capture depth or distance information for any given area or pixel on that plane. For the most advanced systems, the operator of the system can then choose a point on the two dimensional image, at which time the distance data for that point will then be input to a motor which controls focus adjustment in real-time.

These known methods present some limitations. More particularly, these systems are all "line of sight". They cannot focus on an object that is not currently visible in the "two dimensional image plane". The laser system requires an additional operator to target a laser on the desired subject. The facial recognition system will lose track of an object if it turns rapidly, goes off frame or disappears behind another subject or object.

Perhaps most importantly, none of these systems is truly capable of the extreme accuracy required for the most challenging focus tasks, i.e a long focal length with a wide aperture when the subject is moving rapidly and the focus point on the subject is very specific, for example the eye, because for both the LIDaR (Light Detection and Ranging) and laser systems a human operator must keep track of the eye in real-time either by moving a cursor on a screen or by aiming an actual laser. It should also be noted that shining a laser into a person's eye may be undesirable. While the facial recognition system could in theory track and eye, there is a need to provide an increased level of precision and accuracy.

Known to the Applicant are U.S. Pat. No. 5,930,740 (MATHISEN), U.S. Pat. No. 8,448,056 (PULSIPHER), and U.S. Pat. No. 8,562,433 (LARSEN); United States Patent Applications having publication Nos. 2008/0312866 (SHIMOMURA), 2010/0194879 (PASVEER), 2013/0188067 (KOIVUKANGAS), 2013/0222565 (GUERIN), 2013/0229528 (TAYLOR), and 2013/0324254 (HUANG), and Japanese Patent Application having publication No. JP 2008/011212 (KONDO).

Hence, in light of the aforementioned, there is a need for an improved system which, by virtue of its design and components, would be able to overcome some of the above-discussed prior art concerns.

SUMMARY

The object of the present invention is to provide a system which, by virtue of its design and components, satisfies some of the above-mentioned needs and is thus an improvement over other related systems and/or methods known in the prior art.

An object of the present invention is to provide a system and method for controlling a setting of an equipment related to image capture. Such equipment may include a camera, and the setting may be for example a focus setting, a zoom setting, an aperture setting, an inter ocular lens angle setting, and/or control pan setting, a tilt setting, a roll setting of the camera, and/or positional setting of the camera, and/or a lighting equipment setting, and/or a sound equipment setting, and/or the like.

In accordance with an aspect of the present, there is provided a method for controlling a setting of an equipment related to image capture, comprising:
  a) capturing position data and orientation data at a sensing device;
  b) determining, by means of a processor, position information of a region of interest to be treated by the equipment, from the position data and orientation data having been captured; and
  c) outputting, via an output port of the processor, a control signal directed to the equipment, in order to control in real-time the setting of the equipment based on said position information of the region of interest.

The "equipment" may comprise an image capture equipment, such as a camera to capture an image of the subject (either a photo or video image) and/or it may comprise equipment which cooperates with an image capture equipment, such as lighting equipment, sound capture equipment, and/or the like.

In accordance with another aspect of the present, there is provided a system for controlling a setting of an equipment related to image capture, comprising:
  a sensing device configured to capture position data and orientation data;
  a processor being in communication with the sensing device, the processor being configured to determine position information of a region of interest to be treated by the equipment, from the position data and orientation data; and
  an output port integrated in the processor, configured to output a control signal directed to the equipment, in order to control in real-time the setting of the equipment based on said position information of the region of interest.

In accordance with another aspect of the present, there is provided a non-transitional computer-readable storage having stored thereon data and instructions for execution by a computer, said data and instructions comprising:
  code means for receiving position data and orientation data of a sensing device;
  code means for determining position information of a region of interest to be treated by the equipment, from the position and orientation data; and
  code means for outputting a control signal directed to the equipment, in order to control in real-time the setting of the equipment based on said position information of the region of interest.

In accordance with another aspect of the present, there is provided a method for controlling a setting of an equipment related to image capture, comprising:
  a) storing in a memory, one or more identifier, each identifier being associated to a predefined region of interest to be treated by the equipment and storing corresponding position information;
  b) receiving, at a processor, a selection of said one or more identifier; and
  c) outputting, via an output port of the processor, a control signal directed to the equipment, in order to control in real-time the setting of the equipment based on the position information of the selected one of said one or more predefined region of interest.

In accordance with another aspect of the present, there is provided a system for controlling a setting of an equipment related to image capture, comprising:
  a memory configured to store one or more identifier of a predefined region of interest to be treated by the equipment and corresponding position information;
  a processor being in communication with the memory and configured to receive a selection of said one or more identifier; and
  an output port being integrated with the processor, being configured to output a control signal directed to the equipment, in order to control in real-time the setting of the equipment based on the position information of the selected one of said one or more predefined region of interest.

According to embodiments, the components of the above system are provided in a central device (for example a computer), the system further comprising one or more user device (for example a computer, which may be a tablet computer with a touch screen) for receiving user commands, the user device being in communication with the central device. More particularly, the user device may be configured to present the one or more predefined region of interest to a user via a graphical user interface, as well as to receive from the user a selection of said one or more region of interest, and to transmit references to said one or more region of interest to the central device.

In accordance with another aspect of the present, there is provided a non-transitional computer-readable storage having stored thereon one or more identifier of a predefined region of interest to be treated by the equipment and corresponding position information, the computer-readable storage further comprising data and instructions for execution by a processor, said data and instructions comprising:

code means for receiving a selection of said one or more identifier; and code means for outputting a control signal directed to the equipment, in order to control in real-time the setting of the equipment based on the position information of the selected one of said one or more predefined region of interest.

In accordance with another aspect of the present, there is provided a method for controlling a setting of an equipment related to image capture, comprising:
a) capturing, by means of a visibility independent sensing device, position data at the sensing device;
b) determining, by means of a processor, position information of a region of interest to be treated by the equipment, from the position data; and
c) outputting, by means of an output port of the processor, a control signal directed to the equipment, in order to control in real-time the setting of the equipment based on said position information of the region of interest.

In accordance with another aspect of the present, there is provided a system for controlling a setting of an equipment related to image capture, comprising:
a visibility independent sensing device configured to capture position data;
a processor being in communication with the sensing device, the processor being configured to determine position information of a region of interest to be treated by the equipment, based on the position and orientation data; and
an output port integrated with the processor being configured to output a control signal directed to the equipment, in order to control in real-time the setting of the equipment based on said position information of the region of interest.

According to embodiments, the system further comprises a controller being in communication with the output port and being configured to control the setting of the equipment with said control signal.

According to embodiments, the setting may comprise: a focus setting of a camera, a zoom setting of the camera, an aperture setting of the camera, an inter ocular lens angle setting of the camera, a pan setting of the camera, a tilt setting of the camera, a roll setting of the camera, a positional setting of the camera, a lighting equipment control setting, and/or a sound equipment setting In accordance with another aspect of the present, there is provided a non-transitional computer-readable storage having stored thereon data and instructions for execution by a computer having an input port for receiving position data from a visibility independent sensing device, said data and instructions comprising:
code means for determining position information of a region of interest to be treated by the equipment, based on the position data and orientation data; and
code means for outputting a control signal directed to the equipment, in order to control in real-time the setting of the equipment based said position information of the region of interest.

According to yet another aspect of the present, there is provided a system for controlling a setting of an equipment related to image capture, comprising:
a) a sensor to be mounted on a subject to be captured by the camera, adapted for capturing three-dimensional positional data;
b) a processor adapted to communicate with the sensor for receiving the positional data and for generating a control signal based on the positional data; and c) a controller adapted to communicate with the processor, in order to control, in response to the control signal, the setting of the equipment.

In particular embodiments, the setting may include: a focus setting, a zoom setting, an aperture setting, an inter ocular lens angle setting, and/or control pan setting, a tilt setting, a roll setting of the camera, positional setting of the camera, a lighting equipment setting, a sound equipment setting, and/or any combination thereof.

In particular embodiments, the orientation data is captured by the sensor device in all three degrees of freedom, for example in Euler angles of azimuth, elevation and roll (A,E,R). In such embodiments, the processor is adapted to calculate a position of a point of focus, or "node" in relation to the positional and orientation data representing the location of the sensor device. The processor is thus adapted to generate a control signal based on the position of the node.

By "point of focus" or "node" it is meant a particular point or region of intereston the subject based on which the setting (for example, focus, zoom, aperture, lighting, sound, etc.) of the equipment is to be controlled. This "node" is sometimes referred to as the "tip offset" in motion tracking systems that provide both position and orientation for example, in some situations where the node does not have the identical coordinate of the sensor but is at a fixed distance from the sensor. For example, the node may correspond to an eye of a person, while the positional and orientation data corresponds to the back of the person's head where the sensor is located. Thus, the focus, zoom, aperture, inter ocular angle, control pan, tilt, roll of the camera, position of the camera, lighting equipment, and/or sound equipment may be set depending on the particular positioning of the person's eye, through a calculation from the position and orientation of the sensor.

In particular embodiments, the system further comprises a sensor to be mounted on the camera, namely in case the camera moves in relation to the subject to be captured.

According to yet another aspect of the present, there is provided a method for controlling a setting of an equipment related to image capture, comprising:
capturing three-dimensional positional data related to a subject to be captured by a camera;
generating a control signal based on the positional data; and
controlling, in response to the control signal, the setting of the equipment.

According to yet another aspect of the present, there is provided a non-transitional processor-readable storage medium for controlling a setting of an equipment related to image capture, the storage medium comprising data and instructions for execution by a processor to:
receive three-dimensional positional data related to a subject to be captured by a camera;
generate a control signal based on the positional data; and
transmit the control signal to a controller for controlling the setting of the equipment.

According to yet another aspect of the present, there is provided a system for controlling a setting of an equipment related to image capture, comprising:
a sensor and transmitter to be mounted on a subject to be captured by a camera, adapted for capturing positional and/or orientation data;
a processor adapted to communicate with the sensor's transmitter for receiving the positional data and for sending a control signal based on said positional and/or orientation data; and a controller adapted to communicate with the processor, in order to receive the control signal and to control, in response to the control signal, the setting of the equipment.

In accordance with still another aspect, there is provided a method associated to the above-mentioned system.

In accordance with still another aspect, there is provided a non-transitional processor-readable storage medium comprising data and instructions to carry out the method associated to the above-mentioned system.

Embodiments of the present invention are advantageous in that a use of motion tracking data with very specific properties to create multiple predefined positional and directional 'nodes' in three-dimensional space, an increased level of equipment control and automation is achievable in a wide variety of moving and still photographic environments.

Embodiments of the present invention are advantageous in that they allow, with or without user interaction, real-time tracking and/or choosing from multiple pre-defined stationary or moving points in a three-dimensional space (nodes) and without any additional manual intervention, the choosing of any of these nodes at any time using a software interface or mechanical dial or other mechanical input device. In an exemplification of focus control, upon a user selecting a desired node, the system automatically adjusts focus to that node and maintains focus on that node even if the node and the camera are moving. It will also enable focus on a node that is not in the current field of view, allowing objects to be in focus the instant they enter the composition or appear from behind other objects (doorways, walls, vehicles, etc.).

The objects, advantages and features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIG. 5B is a side plan view of a portion of the rod shown in FIG. 5, showing one of the extremities of the rod with a mounting shaft extending therefrom.

FIG. 5C is a profile view of a mounting hole of the source case shown in FIG. 5A, configured to receive the extremity of the rod shown in FIG. 5B.

FIG. 8 shows a node creation/modification window of the GUI shown in FIG. 7.

DETAILED DESCRIPTION OF EMBODIMENTS

Figure 1A:
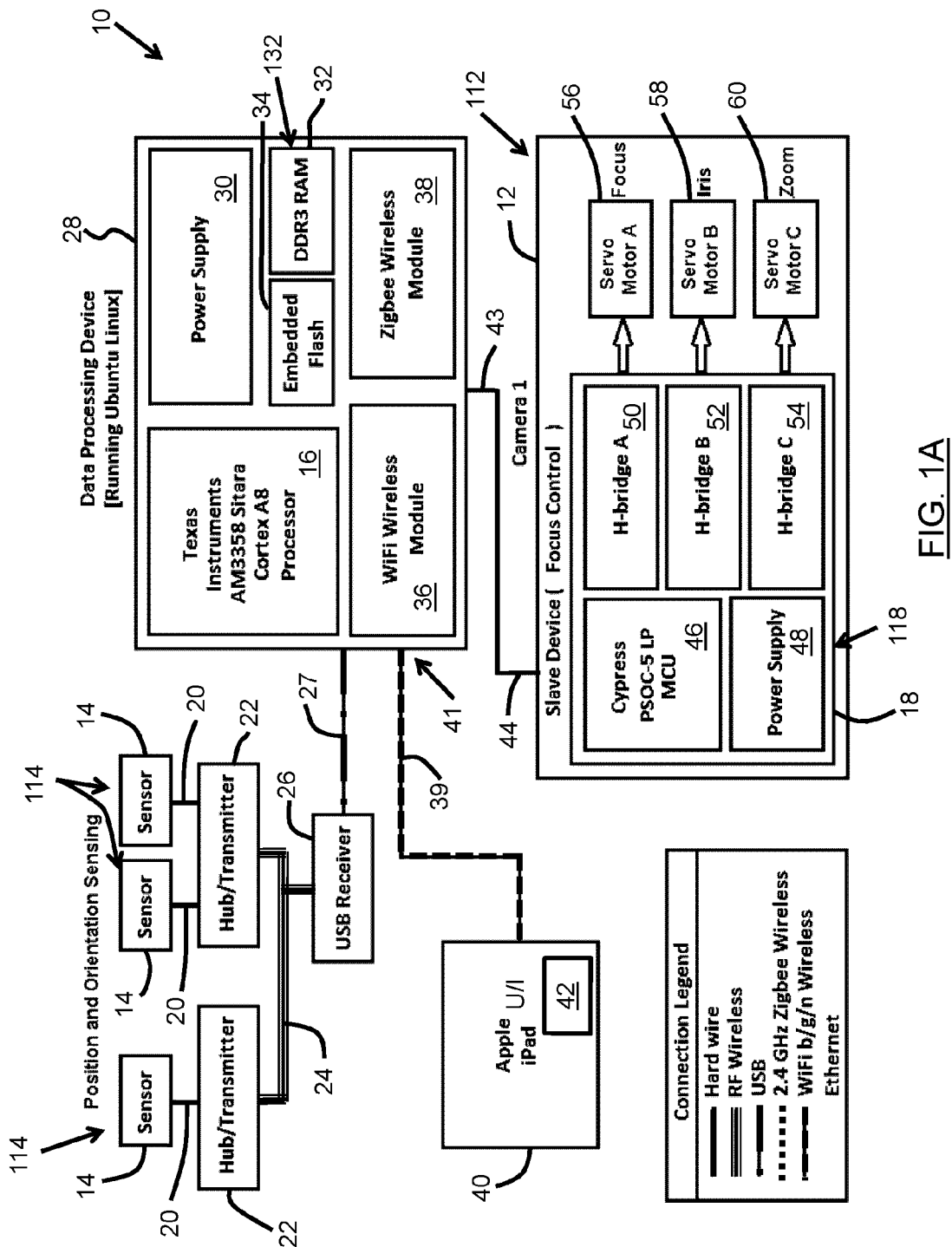
FIG. 1A is a block diagram of a system for controlling camera settings, according to an embodiment of the present.

In the following description, the same numerical references refer to similar elements. The embodiments mentioned and/or geometrical configurations and dimensions shown in the figures or described in the present description are embodiments of the present invention only, given for exemplification purposes only.

Broadly described, the system and method for controlling a setting of a camera, according to a particular embodiment, uses a motion capture or global (or local) positioning system to generate a three-dimensional positional and orientation data. This data is processed by software that computes in real-time the position and orientation in three-dimensional space along with other dimensional calculations including the relative distance data between the desired subject and the camera. This data is then used to control equipment such as servo motors for manipulating camera related equipment such as lens focus, lens aperture, and camera remote heads, all in real-time.

More particularly, the present concerns, according to a particular embodiment, controlling focus and composition, and involves creating pre-defined points in a three-dimensional space, hereafter referred to as "nodes". A node may either be a fixed node in a room, i.e. a vase of flowers. Or it may be a moving node, i.e. a person or animal. Fixed nodes do not require a sensor if the camera is not moving, or if the camera has a sensor. Moving nodes require a sensor as do moving cameras. Since the motion tracking system essentially creates the possibility of drawing an infinite number of defined points in a given three-dimensional space, interfacing with this data allows for vastly more complex and liberating creative and practical possibilities. One important feature of "nodes" as defined and used in this system is that they have both positional and orientation data: this allows for intelligent operations to be performed, such as pulling focus automatically between left and right eye—see "Auto Profiling" later in this document.

Thus when referring to FIG. 1, there is provided a system 10 for controlling a setting of an equipment 112 related to image capture, such as a camera 12. The system 10 comprises one or more sensing device 114, such as sensors 14, configured to capture position data and orientation data at the sensing device. The system 10 further comprises a processor 16 embedded in a data processing device 28 (also referred to herein as "data processing unit"). The processor 16 is in communication with the sensing devices 114, and configured to determine position information of a region of interest to be treated by the equipment 112, based on the position and orientation data. The processor 16 further comprises an output port 43 configured to output a control signal directed to the equipment 112, in order to control in real-time the setting of the equipment 112 based on said position information of the region of interest.

The system 10 further comprises a controller 118 being in communication with the output port 43 and being configured to control the setting of the equipment 112 with the control signal. The system 10 further comprises a memory 132, such as RAM 32, for storing the position data and orientation data. The system 10 further comprises the equipment 112. In accordance with this embodiment, the sensing devices 114 are visibility independent (i.e. non line-of-sight sensors), and comprise a transmitter 22. The system 10 further comprises a receiver 26 which is in communication between the transmitter 22 and the processor 16. The system 10 further comprises a user device 40 comprising a user interface 42 and which is in communication with the data processing device 28 over a wireless communication network 39.

More particularly, FIG. 1 shows a system 10 for controlling a setting of a camera 12. The system 10 comprises sensors 14, each for mounting on a subject to be capture by the camera 12, and each being adapted for capturing three-dimensional positional data based on the location of each sensor 14. The system 10 further comprises a processor 16 adapted to communicate with the sensor 14 for receiving the positional data and for sending a control signal based on the positional data. The system 10 further comprises a controller 18 adapted to communicate with the processor 16, in order to control, in response to the control signal, the setting of the camera 12.

As also shown in FIG. 1, the sensors 14, are each hardwired 20 to a hub/transmitter 22. The hub/transmitter 22 communicates via wireless radio frequency (RF link) communication means 24 to a Universal Serial Bus (USB) receiver 26, which in turn is connected via a USB connection 27 to a data processing device 28, having the processor 16 embedded therein.

The data processing device 28 further comprises a power supply 30 and a DDR3 random access memory (RAM) 32, and embeds a Flash non-volatile computer storage 34. The data processing device 28 further comprises a WiFi communication module 36 and a Zigbee™ wireless communication module 38 for communicating over a wireless data network 39 with a user device 40, which in this example is an iPad™, and includes a user interface 42. It is to be understood that the iPad™ may be replaced or combined with any other suitable computer device such as for example and Android™ tablet computer.

The controller 18 is connected to the data processing device 28 over a hardwire 44. The controller 18 is attached in an area of the camera 12, and comprises a Cypress PSOC™ 5 LP micro-controller unit (MCU) 46, as well as a power supply 48. H-bridges 50, 52, 54 connect the controller 18 to respective servo motors 56, 58, 60 which automatically operate particular settings of the camera 12, namely focus, iris and zoom respectively.

It is to be understood, that according to alternative embodiments, the above-mentioned components may be interconnected in any suitable manner via any suitable communication means.

Figure 2A:
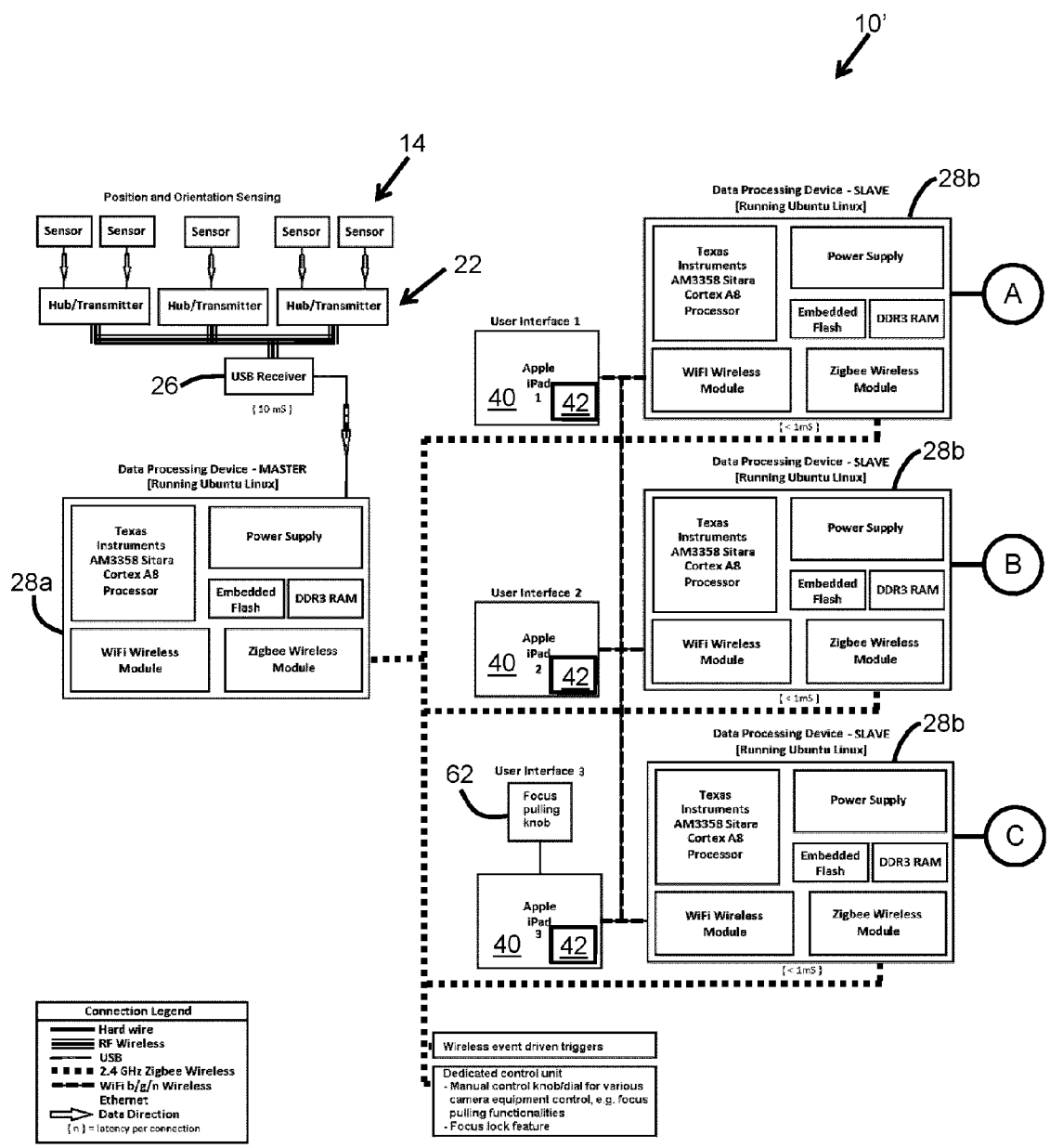
FIGS. 2A and 2B show a block diagram of a system for simultaneously controlling multiple camera settings and camera controls, according to another embodiment of the present invention.
Figure 2B:
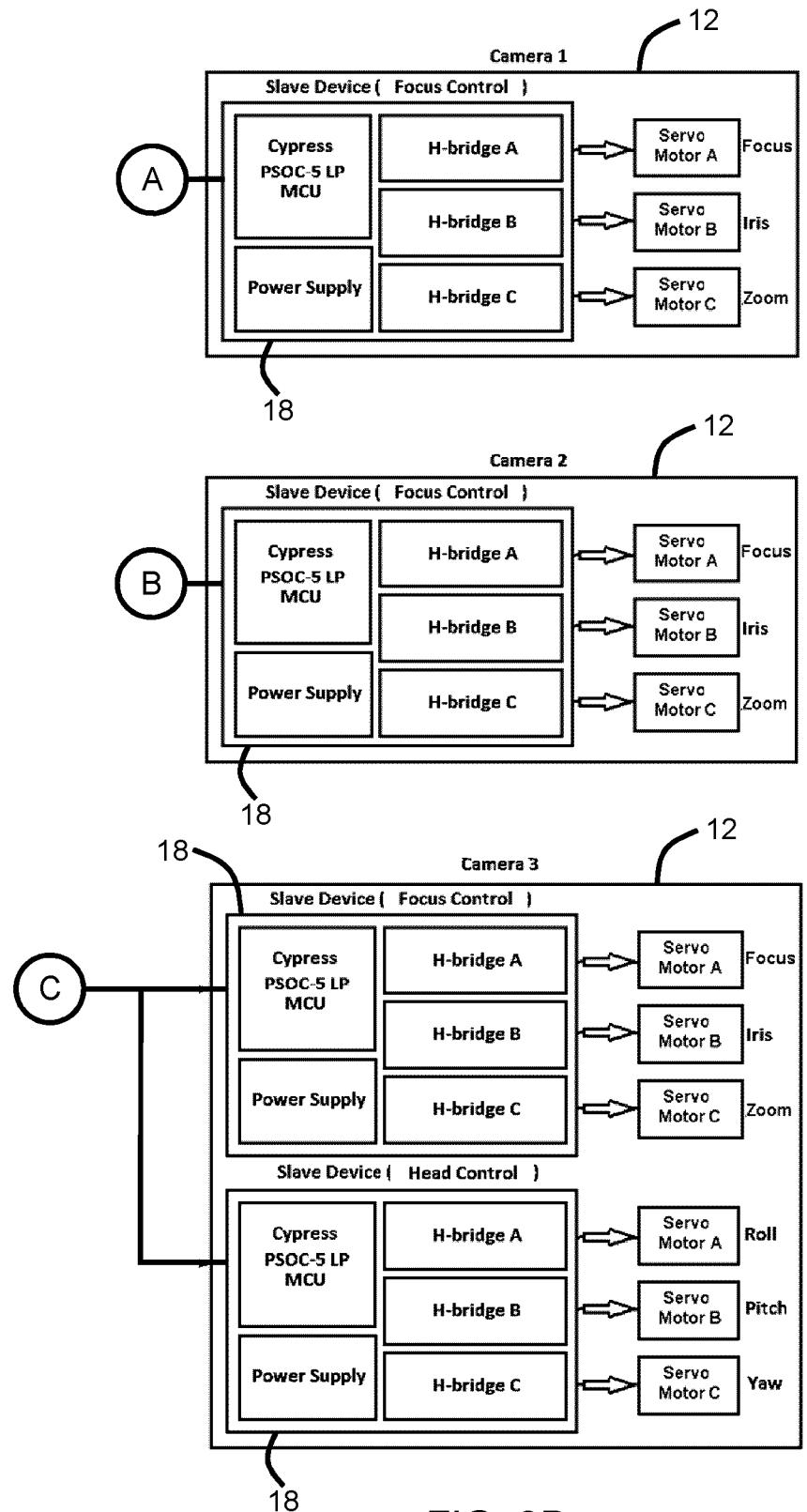

Indeed and for example, in the embodiment shown in FIGS. 2A and 2B, a plurality of cameras 12 are controlled by the system 10'. Each camera 12 is connected to a "slave" data processing device 28b, which is operable via corresponding user interfaces of user devices 40. The "slave" data processing devices 28b are in communication with a "master" data processing device 28a.

The remaining components of FIGS. 2A and 2B refer to similar components shown in FIG. 1.

In the embodiments shown in FIGS. 1 and 2, the sensor system is provided by a magnetic motion tracking system. More particularly, the sensor 14 is provided by an induction coil and the system 10, 10' further includes an alternating current (AC) magnetic source generator (see FIG. 3). The hub 22 powers the sensor 14, interprets the data and transmits the positional data over radio frequency 24.

Preferably, the magnetic source is mounted together with onboard power, on a custom extendable pole mount.

Optionally, a radio frequency repeater may be provided to extend the range of data transmission coming from the motion capture system. The USB RF receiver needs to get data from the sensor and transmit it to the camera. If the distance between camera and sensor is very large (for example when using a 2000 mm or 200 mm lens for car commercials etc) then it may be necessary to boost the range. Also optionally, a USB repeater may be provided in order to extend the range of data transmission coming from motion capture system.

The user interface 42 of each user device 40, i.e. iPad™, includes a touch screen, and the user device 40 is adapted to execute interface software which communicates with the central controller(s) 28, 28a, 28b.

Optionally, mechanical input devices (e.g. focus control dial or slider) may be provided to act as an analog/digital interface to add additional control features to the software. For example, as illustrated in FIGS. 2A and 2B, one of the user devices 40 has a user interface 42 including a focus pulling knob 62.

The central data processing device 28, operates with a Linux™ operation system, and performs much of the processing to control the servo motor(s) 56, 58, 60.

As previously mentioned, the servo motors 56, 58, 60, mechanically adjust camera settings, such as, for example, focus, zoom, aperture and/or control pan, tilt, roll, and/or the like.

It is to be understood that depending on particular embodiments, the setting may include any one of the following or a combination thereof: a focus setting of a camera, a zoom setting of the camera, an aperture setting of the camera, an inter ocular lens angle setting of the camera, a pan setting of the camera, a tilt setting of the camera, a roll setting of the camera, a positional setting of the camera, a lighting equipment control setting, a sound equipment setting, and the like.

In the context of the present description, the term "processor" refers to an electronic circuitry configured to execute computer instructions, such as a central processing unit (CPU), a microprocessor, a controller, and/or the like. A plurality of such processors may be provided, according to embodiments of the present invention, as can be understood by a person skilled in the art. The processor may be provided within one or more general purpose computer, for example, and/or any other suitable computing device.

Still in the context of the present description, the term "storage" refers to any computer data storage device or assembly of such devices including, for example: a temporary storage unit such as a random-access memory (RAM) or dynamic RAM; a permanent storage such as a hard disk; an optical storage device, such as a CD or DVD (rewritable or write once/read only); a flash memory; and/or the like. A plurality of such storage devices may be provided, as can be understood by a person skilled in the art.

Moreover, "computer-readable storage" refers to any suitable non-transitory processor-readable storage medium or computer product.

Other components which may be used with the above-described system 10, 10' include:

- a custom modular system of non-metallic pole mounts for source placement, namely a carbon fiber scaffolding rig with pre-determined sizes so that it can be quickly and easily set up, when using more than two sources.
- various clips and brackets for mounting sensors and magnetic sources to cameras, subjects and objects; and
- various instruments for facilitating easy measurement of node offsets and placement and source locations.

Figure 3:
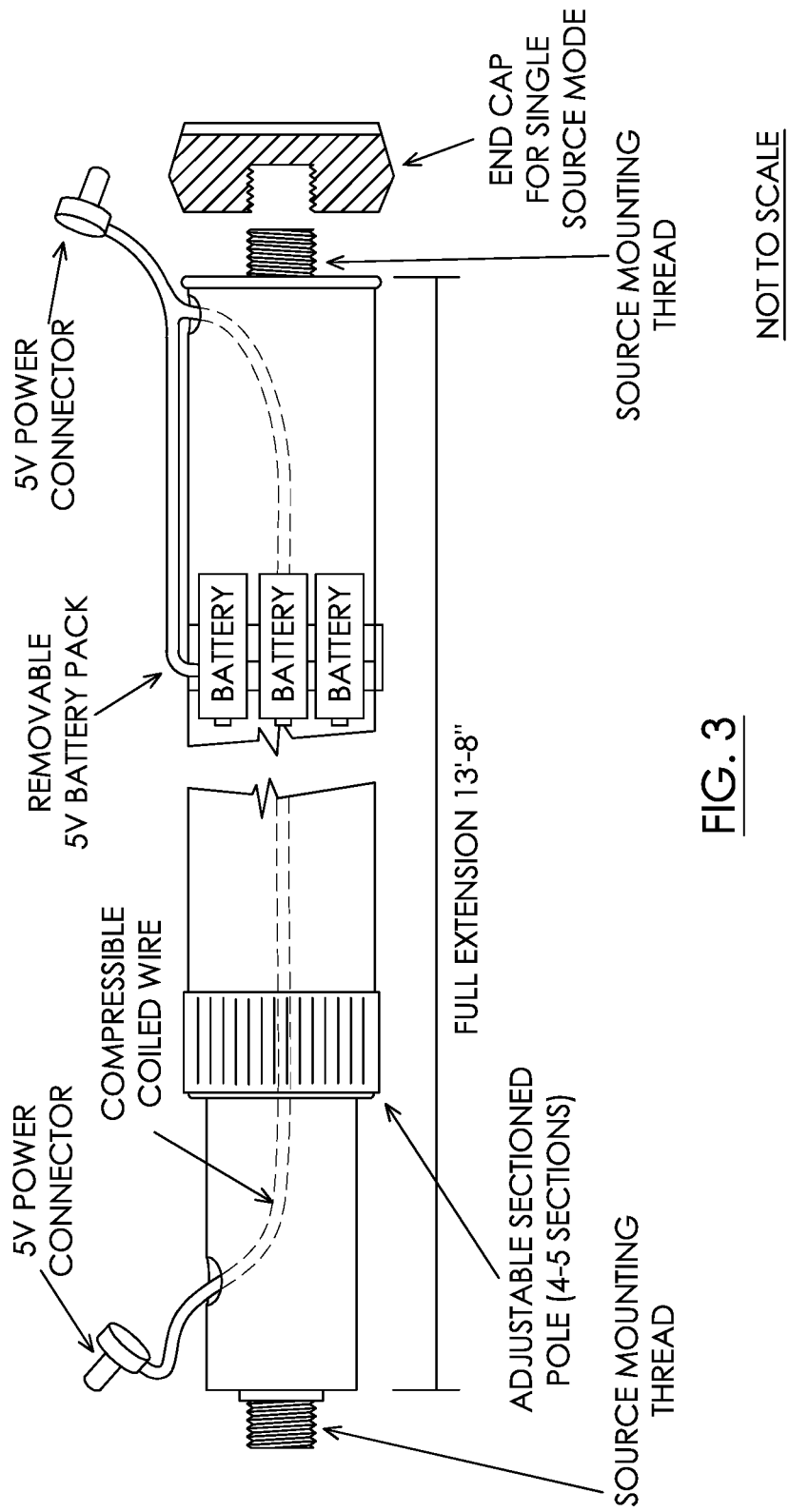
FIG. 3 is a schematic diagram showing a single or double boom pole source mount to be used with the system shown in FIG. 1A, according to an embodiment.
Figure 4:
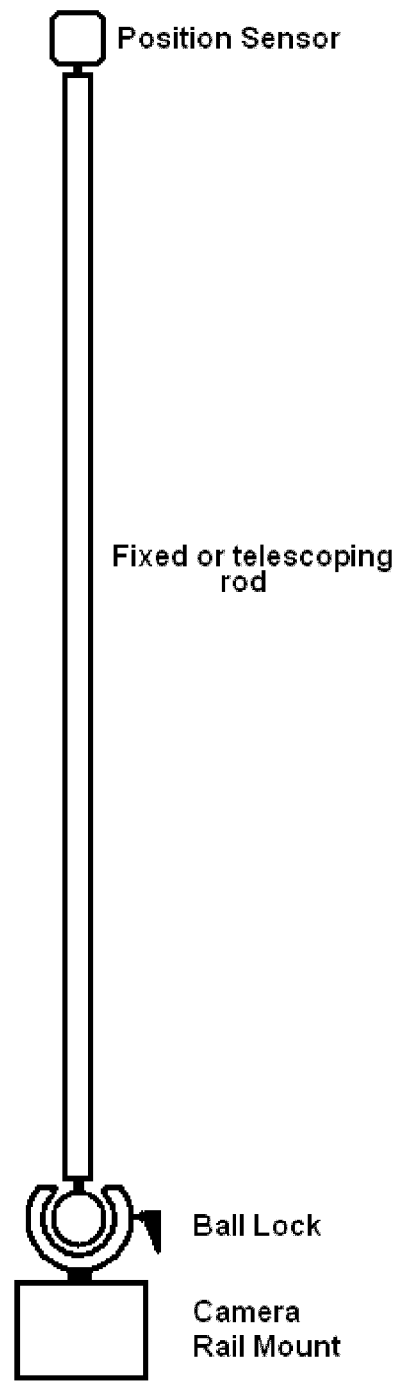
FIG. 4 a schematic diagram showing a camera arm source mount to be used with the system shown in FIG. 1A, according to an embodiment.
Figure 5:
FIG. 5 is a schematic diagram showing a camera sensor mount to be used with the system of FIG. 1A, according to an embodiment, the camera sensor mount comprising a rod and source cases mounted at each extremity of the rod.
Figure 5A:
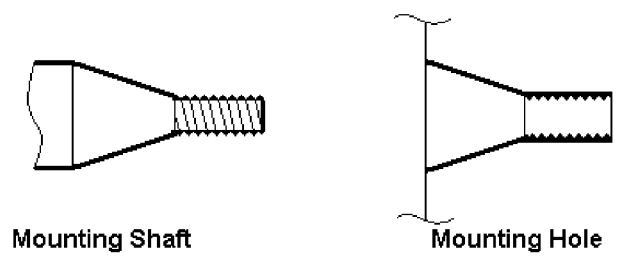
FIG. 5A is a perspective view of the source case of the camera sensor mount shown in FIG. 5.
Figure 5A:
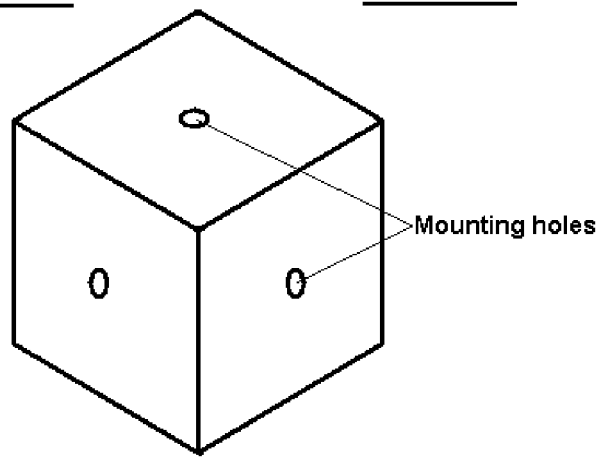
Figure 6:
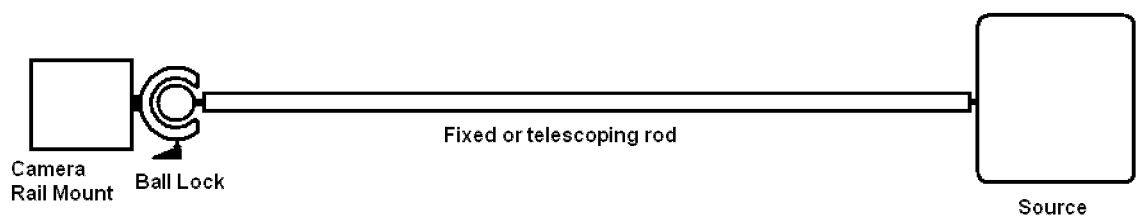
FIG. 6 is a schematic diagram showing a modular source mounting system to be used with the system of FIG. 1A, according to an embodiment.

Namely, FIG. 3 shows a single or double boom pole source mount to be used with the system, according to an embodiment. Moreover, FIG. 4 shows a camera arm source mount to be used with the system, according to an embodiment. Moreover, FIG. 5 shows a camera sensor mount to be used with the system, according to an embodiment, with portions thereof being shown in FIG. 5A-5C. Furthermore, FIG. 6 shows a modular source mounting system to be used with the system, according to an embodiment.

Operation of the System

As previously mentioned, embodiments of the present allow controlling focus and composition and involves creating pre-defined points in a three-dimensional space, referred to herein as "nodes", having both positional and orientation data. A node can either be a fixed node in a room, i.e a vase of flowers. Or it can be a moving node, i.e a person or animal. Fixed nodes do not require a sensor if the camera is not moving, or if the camera has a sensor. Moving nodes require a sensor as do moving cameras.

In operation, with reference to FIG. 1 the sensor 14 generates a coordinate representing it's physical location, for example an X,Y,Z coordinate of a Cartesian coordinate system and/or an Azimuth, Elevation, Roll (A, E, R) which represents the orientation of the sensor. For example, in the case where the sensor 14 is placed on the back of the head of a person being capture by the camera 12, the information generated by the sensor will indicate the location of the sensor and whether the person's head is facing forward, backward, etc.

The processor 16 receives the position and orientation information and calculates the position of the "node". For example, in the case where the sensor 14 is placed on the back of the head of a person, a "node" may correspond to one of the eyes of the person. Thus, the processor 16 seeks the predetermined position of the person's eye in relation to the sensor 14, and calculates the location of the eye, i.e. the point of focus, based on the location and orientation information received. The processor then calculates the distance between the camera 12 and the point of focus. Based on the calculated distance, the processor 16 outputs a control signal in order to control settings of the camera 12.

Figure 1B:
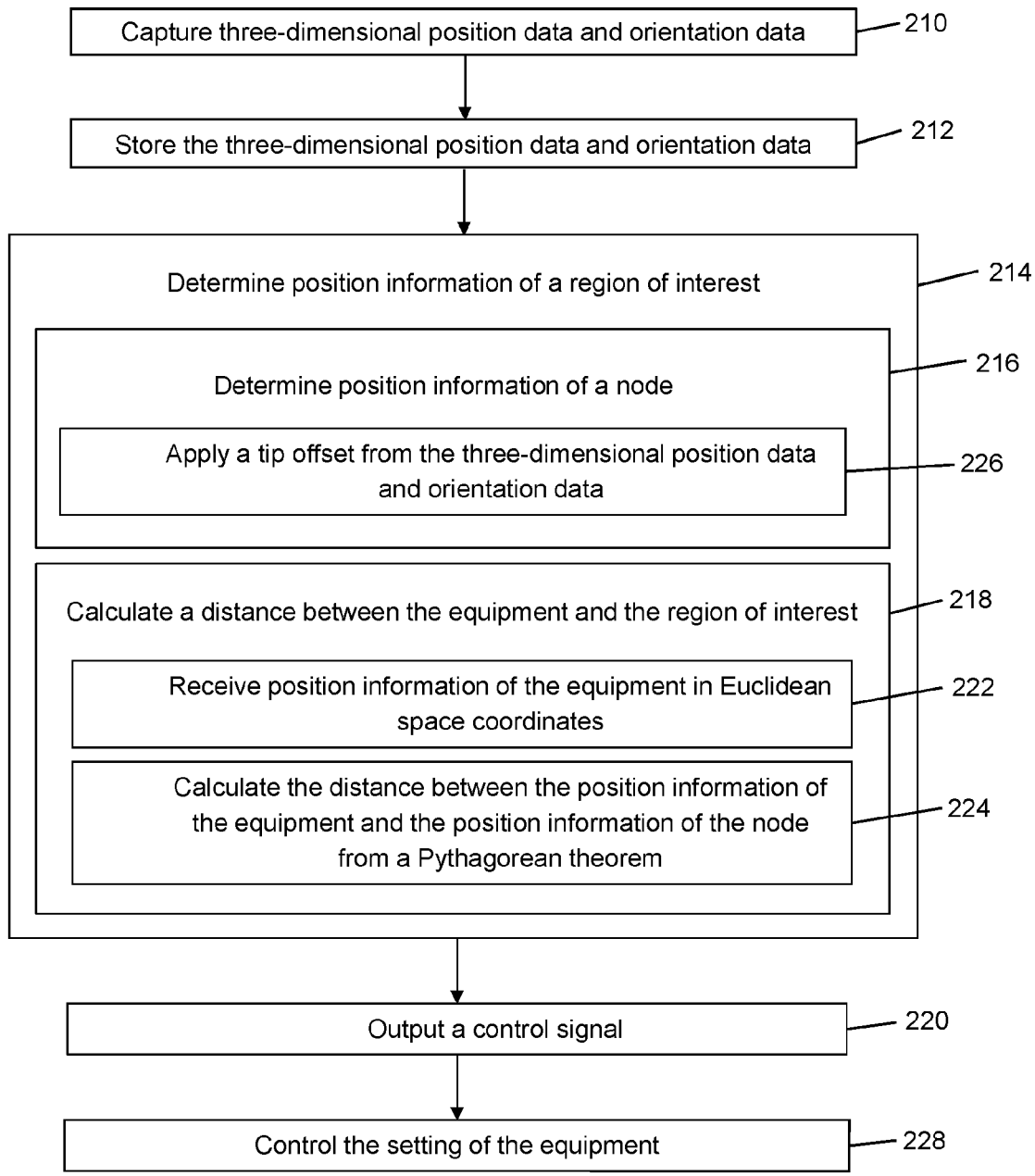
FIG. 1B is a flow chart representing steps of a method executed by the system shown in FIG. 1A, in accordance with an embodiment.

Thus, as better shown in FIG. 1B with further reference to FIG. 1A, there is provided a method 200 for controlling a setting of the equipment 112. The method 200 comprises capturing 210, by means of the sensing device 114, three-dimensional position data and orientation data of the sensing device 114, and storing 212 the position data and orientation data in the memory 132. The position data and orientation data is captured by the sensing device which produces a coordinate representing a physical location and a property representing the orientation of the sensing device 114. The method 200 further comprises determining 214, by means of the processor 16, position information of a region of interest to be treated by the equipment, i.e. a "node", based on the three-dimensional position data and orientation data. The node and the sensor device 114 are typically located a different locations. The processor 16 thus determines 216 the position information of the node, and further calculates 218 a distance between the equipment 112 and the node.

The method further comprises outputting 220, via output port 43, a control signal directed to the equipment 112, based on the calculated distance.

More particularly, a "Distance Formula" is derived from the Pythagorean theorem and calculates the distance between two points in three-dimensional Euclidean space (x1,y1,z1) and (x2,y2,z2). Once the exact position of two nodes are determined, the distance formula can be used to calculate the distance between these nodes. For the example of focusing a camera, if one of the nodes is the centre of the focal plane on a camera, the external focus ring or internal electronic focus mechanism of the lens can be set to that distance in order to focus an object.

More particularly, the position information of each node in the computing step 216 comprises Euclidean space coordinates of the node $(x_1,y_1,z_1)$, and the calculating step 218 comprises:

receiving 222 position information of the equipment in Euclidean space coordinates $(x_2,y_2,z_2)$; and calculating 224 the distance between the position information of the equipment and the position information of the node from the following pythagorean theorem:

$$\text{distance}=\sqrt{(x_1-x_2)^2+(y_1-y_2)^2+(z_1-z_2)^2}$$

For a motion tracking sensor that measures both position and orientation, vector mathematics can be used to apply a "tip offset" to the location of the sensor. For example if an actor puts a sensor on the back of his/her cranium, a tip offset could project the location of the sensor to the surface of the actor's left eye, in effect creating a virtual sensor on the actor's eye. For rigid subjects/objects, applying a tip offset allows for nodes to be defined anywhere inside or on the surface of the subject/object. Likewise, tip offsets (nodes) can be created anywhere in 3D space, i.e. they can exist outside an object representing a location coordinate relative to the sensor's position and orientation. Thus, the determining step 216 comprises applying 226 a tip offset from the position data and orientation data of the sensing device 114 of the capturing step 210 in order to calculate the position information of the node.

One method to perform this tip offset (node) projection makes use of measured X, Y, and Z offsets from that sensor's origin to the eye, with respect to the axis system defined by the sensor. For the eye example, the offsets could be 10 cm in the X-direction, 0 cm in the Y-direction, and 8 cm in the Z-direction with respect to the sensor's local coordinate system. With these offsets, rotational matrices and/or quaternions can be used to calculate the absolute position (X,Y,Z) and orientation (yaw, roll, pitch) of the actor's eye in the motion tracking system's coordinate system. The following equations use a standard rotational matrix approach to solving this tip offset problem (see http://www.flipcode.com/documents/matrfaq.html#Q36).

Thus, in this embodiment, step 226 of applying the tip offset (see FIG. 1B) comprises obtaining relative coordinates of the node relative to the three-dimensional position data and orientation data of the sensing device 114, within an axis system defined by the sensing device 114. In this case, the determining step 216 comprises evaluating an absolute position of the node in relation to the equipment 112.

The absolute position of the node is evaluated as follows:
Using the rotation matrix M=X.Y.Z where M is the final rotation matrix, and X,Y,Z are the individual rotation matrices.

$$M = \begin{vmatrix} CE & -CF & -D \\ -BDE+AF & BDF+AE & -BC \\ ADE+BF & -ADF+BE & AC \end{vmatrix}$$

Where:
A,B are the cosine and sine, respectively, of the X-axis rotation axis, i.e. roll;

C,D are the cosine and sine, respectively, of the Y-axis rotation axis, i.e. tilt;

E,F are the cosine and sine, respectively, of the Z-axis rotation axis. i.e. pan;

$$X_f = X_s + X_t*M(1,1) + Yt*M(2,1) + Zt*M(3,1);$$

$$Y_f = Y_s + X_t*M(1,2) + Yt*M(2,2) + Zt*M(3,2);$$

$$Z_f = Z_s + X_t*M(1,3) + Yt*M(2,3) + Zt*M(3,3);$$

where:

$X_f, Y_f, Z_f$ are absolute (or "final") coordinates of the node;

$X_s, Y_s, Z_s$ are coordinates of the sensing device's center;

$X_t, Y_t, Z_t$ correspond to coordinates of the tip offset relative to the sensing device's center;

M(row,column) are elements of the rotation matrix in terms of row and column, respectively, with the element "row" representing the row number of within the matrix and the element "column" representing the column number of within the matrix.

The measurement of the "tip offsets" may be facilitated by another method. For example, there is a sensor is on the back of an actor's cranium with an initial orientation which can be represented in Euler angles or by a quaternion. A user wishes to define a node on the actor's left eye. Another motion tracking sensor can be placed against the actor's eye to calculate the X, Y, and Z offsets (instead of attempting to use measuring tape for instance). One solution is to measure the "tip offset" and orientation at this initial time. Given the base sensor at position, P1, and the sensor at the desired node point, P2, the "tip offset", V1, is P2−P1. The initial orientation can be defined as quaternion Q1 with X, Y, Z, and W attributes. At any other time, there will be a new orientation, Q2.

Thus, in this embodiment, step 226 of applying the tip offset comprises obtaining a tip offset having been precalculated by a position of a node sensing device located at a position of the node, in relation to a position and orientation of a base sensing device located at a position of said sensing device. As mentioned above, the initial orientation is defined as quaternion $Q_1$ with X, Y, Z, and W attributes, the orientation data of the capturing step is defined as $Q_2$. The position information of the node is determined according to:

$$P_n + (q_i q_n) P_i (q_i q_n)$$

where:

$P_i$ is the offset from the sensor at orientation q;

$P_n$ is the current position of the sensor;

$q_i$ is the orientation of the sensor at the time $P_i$ is calculated;

$q_n$ is the current orientation of the sensor; and $q_i$ and $q_n$ are unit quaternions.

Various other approaches and/or method may be carried out in order to the position and/or orientation data to perform a variety of advanced system functions. An example may be the use of quaternions to calculate the position and orientation of a motion capture "magnetic source" relative to the origin of the motion capture coordinate system. If a member of a film crew places a source at a random position and orientation, then with the use of a motion sensor in the range of this random source, along with data from a sensor or source of known position and orientation, and data from a distance measuring device such as a laser tape measure, the exact position and orientation and the random source may be determined. Simple accessory tools and software may render this exemplified process very quick and simple to carry out.

Referring back to the embodiment shown in FIGS. 1A and 1B, the method 200 further comprises controlling 228, by means of the controller 118 (which is embedded in the equipment 112), the setting of the equipment 112 with said control signal.

Given that the node is offset from the sensor, the orientation data advantageously allows positioning the node even if the sensor turns, as the position of the offset rotates with the sensor. For example, a sensor may be mounted on the handle of a sword, and the focal point could be fixed to the tip of the sword and tracked with high precision no matter how the sword is moved and rotated.

A further advantage of using orientation data relates to a "calibration offset" function. With orientation data, it is possible to use a second sensor to instantly calculate the desired offset position of the focal node. For example, placing a sensor on the back of a performer's neck and then placing a second "calibration sensor" on the performer's eye is a fast and powerful way to create nodes. This feature will be better explained further below.

A further advantage of using orientation data relates to a "quick set" function, which is a special case of the calibration offset feature. The quick set function is useful when both the camera and the subject have sensors mounted to them and the camera is pointed at a subject where the sensor is positioned out of sight, on their back, for example. The camera focus is then adjusted until the desired part of the subject is in focus, their eyes, for example. Using both the orientation data from the subject and the camera and then using the distance data indicated by the lens, it is possible to also obtain quick and suitably accurate setup of focal nodes.

Various functional features and aspects, in accordance with particular embodiments of the present invention, will now be described.

Figure 1C:
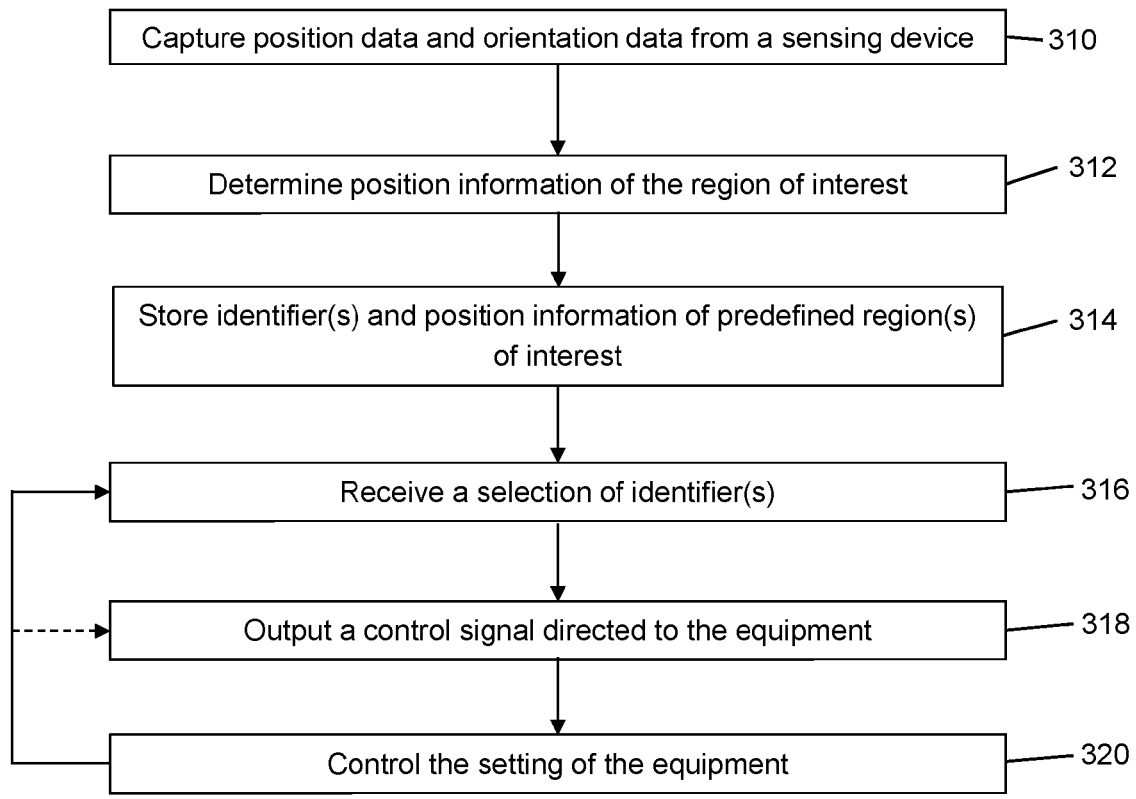
FIG. 1C is a sequence diagram representing a method executed by the system shown in FIG. 1A, in accordance with an embodiment.

According to the embodiment shown in FIG. 1C, with further reference to FIG. 1A, there is shown a method 300 for controlling a setting of an equipment related to image capture. The method 300 comprises storing 314 in the memory 132, one or more identifier of a predefined region of interest (i.e. a "node") to be treated by the equipment 112 and corresponding position information (i.e. three-dimensional coordinate relative to the equipment). The position information is obtained by: capturing 310 position data and orientation data at the sensing device 114; and determining 312 the position information of the region of interest to be treated by the equipment 112, from the position and orientation data of the sensing device 114. The method 300 further comprises receiving 316, at the processor 16, a selection of the one or more identifier. The method 300 further comprises outputting 318, by means of the output port 43, a control signal directed to the equipment 112, in order to control 320 in real-time the setting of the equipment 112 based on the position information of the selected region of interest.

The Node Array:

By pre-defining nodes (either stationary or moving) it is possible to create an array of desired nodes in the interface. Simply by selecting the node the lens will instantly focus on, and/or the camera will point to and compose that node in the field of view. This allows for on the spot improvisation, extremely rapid rack focusing between large numbers of subjects/objects and the ability to accurately adjust between two moving subjects/objects without requiring any act of manual measurement or manual adjustment of focus dial—or in the case of camera operation, any manual adjustment of the camera itself. Thus, in this case, the receiving step 316 of the method 300 depicted in FIG. 1C comprises receiving a predetermined sequenced selection of nodes; and the method repeats the outputting step 318 for each node selected in order to automatically control 320 the setting of the equipment 112 sequentially for a plurality of nodes, in accordance with the sequenced node selection.

Node Sequencer:

It is also possible to create a pre-defined sequence of nodes, which suits the current paradigm of cinematic film production where a director knows the order of subjects in advance. In this way, by pre-loading desired nodes it is possible to simply shift from one subject/object to the next by simply clicking a "next" button, or turning a dial (real or virtual) back and forth the user can not only switch between two subjects at any desired moment, but can also dictate the speed at which the focus adjusts between subjects (speed of the focus pull). Thus, the afore-mentioned repeating of steps 318, 320 shown in FIG. 1C (with reference to FIG. 1A) is prompted upon receiving a user input command, via an input port 41. Alternatively, the steps 318, 320 are repeated based on a predetermined schedule stored in the memory 132.

Geometric Slider:

It is also possible to arrange graphical representations of the nodes (or node array) in geometrical (triangles and squares) or random patterns (zig-zag lines, curved lines etc.) on a touch screen device, and, by sliding a finger between each node the user will be "pulling focus" between subjects, again having control over the speed of the pull and again, having no need to measure or adjust the actual focus distance regardless of movement of subjects or camera.

Thus, the method 300 shown in FIG. 1C (with reference to FIG. 1A) further comprises receiving a user input command via a sliding motion on a touch screen, through the input port 41, corresponding to a displacement between two adjacent nodes, wherein the selection of the receiving step 316 comprises the identifiers of the adjacent nodes. The method 300 further comprises correlating intermediate positions between the adjacent nodes in accordance with the displacement, the outputting step 318 is repeated for each of said intermediate positions.

Interface Modes:

Using the Node Array, the Sequencer, the Geometry Slider and the hardware dial or other input device it is possible to choose between two basic modes of focusing.

One mode is "tap to focus" where a user simply taps a button (virtual or on physical input device) to choose a node or move forward in the node sequence to the next predetermined node. In this mode it should also be noted that it is possible to pre-determine the speed at which focus is adjusted when the next node is selected either by pre-defining a preference, or by adjusting a virtual "speed dial" or analog input device.

The second mode is "slide to focus" where the user not only selects the next node, but by using either the geometry slider, the virtual dial or the analog input device is able to select the next node and in real-time effectuate the speed at which the focus is adjusted. This emulated the current focus pulling paradigm, where a focus puller is in control of the speed of the adjustment, without introducing any danger of missing focus on the desired subject.

Tip Offset and Multiple Nodes from Single Sensor:

By using sensors with provide real-time position and orientation data it is possible to create multiple nodes using the same sensor. This is done by inputting an "offset value" using X,Y,Z, position coordinates and a relative azimuth, elevation, roll coordinate. Hence, a sensor attached to the back of a subject's head can have several nodes associated with the head, since it is a rigid object. The eyes, the tip of the nose, the ears, etc, can all be defined as nodes from a single sensor using this technique.

Fine Adjust for Tip Offset:

In situations where it may be difficult to measure an accurate offset in three-dimensional space two automation techniques are provided:

Presuming the sensor is in place on the back of an actor's neck and the desired node is in fact the eyes, a second sensor can be placed momentarily on the eyes. Using the data from the second sensor the "tip offset" data can be automatically calculated and applied to the node.

A tip offset can be adjusted manually by having the subject stand in view of the camera, then the focus puller can adjust the focus until the desired node is in focus (usually the eyes). The system is able to approximately calibrate its own tip offset because it knows the orientation of the sensor and it will know how far the focus has been adjusted relative to the sensor data.

Auto Profiling:

If a user defines a node as the eyes using a sensor hidden elsewhere on the performer's body, it is possible to inform the system that this node is in fact "two nodes", a left and a right eye. Since the system knows at all times where the camera is and where the subject is and how the subject is oriented relative to the camera it can, for example, focus on the left eye when the left side of the face is towards the camera and the right eye when the right side of the face is towards the camera. Thus, the method 300 shown in FIG. 1C (with reference to FIG. 1A) further comprises determining the node (or region(s) of interest) which satisfies a given condition, among the selection of nodes received at step 316. The signal of step 318 is thus generated according to the node which satisfies the given condition.

Likewise, any rotating subject or object could have several "auto profiling" nodes associated with it which can be triggered as the subject or object turns.

Zoom Control:

Similar to pulling focus the position and orientation data can also be used for adjusting zoom. For example if it is desired to keep a subject at exactly the same size in frame regardless of their distance, by entering the lens parameters the system can auto-zoom in and out as the subject or object moves. NB: this effect is sometimes referred to as the "Dolly Zoom" or the "Triple Reverse Zoom", and currently requires a very steady camera motion and multiple rehearsals to achieve. This system enables this effect to be created in hand held shots and with random performer and camera movements.

Mirror Mode:

It is also possible to extend the function to calculate virtual distances and or angles, as would be required for photographing reflections in a mirror, for example. Where the focal distance between a camera and a subject reflected in a mirror equals the distance from camera to mirror PLUS the distance from mirror to subject, by placing a sensor on the mirror and the subject (and the camera if moving) the system can quickly calculate the correct virtual distance to focus on reflections when desired.

Focus Based on Optimal Focal Plane between Two Nodes or Two Offset Nodes:

It may be desirable for example, to focus on two subjects each of which are wearing sensors. One may thus choose a midway point so that the chosen lens will allow for the subjects to both be in focus as the focal plane will be midway to each subject and will allow for best possible focus of both subjects as the focal plane will be at approximately the midway point of the depth of field. The operator may choose any point between the two subjects as well especially if they wish to ensure that one of the two subjects is given priority and definitely in focus in the event that the other subjects go outside of the range of the depth of field.

Inter Ocular Angle Adjust for 3D Production:

Some three-dimensional photography setups require real-time adjustment of inter ocular angle. This system can automate that adjustment by tethering this angle to the chosen subject/object.

Aperture Control:

In some situations it may be desired to "pull aperture" to adjust the amount of light going into the lens, for example when moving from a bright outdoor location to a dark interior during a single shot. By tethering camera position to aperture adjustment the aperture adjustment can be performed automatically for a range of pre-determined locations. In addition, because orientation data is available for the camera the aperture can be adjusted based simply on the direction of the camera allowing for the currently impossible scenario where a set or location can be lit to more than one "key light" and the aperture will always adjust smoothly between these exposure values.

Save Setups:

It is possible using this system to pre-plan very complex shots or scenes and enter all required data concerning the "nodes" and any sequences into a file on the interface software. This saving of "scenes" greatly improves on set efficiency and also gives creators the ability to plan and prepare highly complex shots that are not possible with current technology.

Distance Displays:

It is possible for the system to calculate the relative distance between subject and camera at any time and display this as distance data on any desired readout at any time. For example, the selected "node" distance data can always be displayed on the main control screen of the software interface. In addition "satellite devices" can tie in to this distance data, and users can select any node at any time to determine data.

For example a focus puller may be focused on Actor A during a rehearsal, but the cinematographer may wish to know how far away Actor B is to access the required light level to create the depth of field requested by the director. Using a handheld device like and iPod Touch™ or smart phone the cinematographer could access in real-time the distance data for Actor B, even while Actor A is in focus.

Multi Camera Support:

This system allows the user to setup one or more cameras, with no definable upper limit, and target multiple cameras to the same object or target each camera to separate objects.

Other Real-Time Data Displays:

Having access to real-time data also allows for other real-time calculations and indicators:

Depth of field for any given node at any given time.

Min focal distance warning—e.g.: distance can display in orange when pre-defined close distance is reached and flash red when the subject reaches actual minimum focal distance.

Manual Overrides and Automatic Handoff:

Since any focus puller or camera operator may want to manually control focus at any time, regardless of the efficiency of a system, this system enables full instant manual or automatic switching between automatic and manual. These are the methods available in the current system:

A digital fine adjust "dial" is permanently available to the focus puller. Simply by adjusting this fine adjust the focus puller can override the automatic focus setting by any amount.

"Slate Mode". By selecting a button the auto system immediately switches to full manual.

"Auto Handoff". This mode allows the user to pre-define a point at which a node, subject or object switches from auto to manual and vice versa. This may be useful when using very long lenses with subjects that travel a great distance and or may be a method for avoiding unwanted variances in the data.

Boom Mounted Source:

Since the film industry is already accustomed to the process of mounting a microphone on a long extendible pole—referred to as a "boom pole", one unique implementation of this system is to mount a magnetic source on a boom pole which can then be positioned over the performance area in the closest convenient location, in exactly the same way that a microphone is positioned over the performance area in the closest convenient location. If both subject and camera are equipped with sensors perfect focus data can still be gathered for multiple nodes. However, this method does not allow for camera operation or the use of fixed nodes not associated with a sensor.

Double (and Multiple) Source Boom:

Expanding on the basic idea of mounting a single source on a boom pole it is also possible to mount two sources, one on either end of a boom pole, to expand the range. Likewise other handheld configurations, a triangle or square, for example can extend the range, allowing for quick setups requiring no on set calibration since the relative positions of the sources can be pre-configured in the setup software.

Camera Mounted Source:

Mounting the source directly on the camera and using the software to calibrate the relative position of the camera to the source it is possible to operate the system without a sensor on the camera. This allows for a rapid setup "single source system" which provides great accuracy at close range where it is most needed for acute focus.

Modular System:

Multiple sources (no theoretical upper limit) can be arranged in pre-determined configurations or randomly. Pre-determined configurations can enable quick setups, (such as a equilateral triangle with 10 ft sides) and cover larger areas. Random configurations require some manual setup in software but allow for great flexibility in the shape and area to be covered by the system.

Stationary Magnetic Source (or Optical Sensor) Calibration:

Since the system uses multiple magnetic sources, (or in the case of infrared, multiple cameras) and the X,Y,Z and A,E,R of each source needs to be entered into the system, a simple interface for entering this data is included in the system.

Predictive (or Kalman) Filtering:

Since any automated system is looking at data in real-time it is always looking in the past. Though this system will be extremely fast, even a microsecond lag could have visible effects in extremely challenging situations i.e. very long lenses in low light with rapidly moving subjects. Currently film makers and cinematographers avoid these challenging situations and in fact spend large amounts of money in overcoming them, most notably in the rental of very expensive lighting packages to maintain an average f/stop of 5.6. With the addition of predictive algorithms to the system it is very easy to overcome any slight lag in data by compensating for any delay in focal position by adjusting the focal position in a fixed proportion relative to the subject's speed of motion towards or away from the camera. With the addition of this feature even the most obtaining focus under even the most challenging situations is relatively simple.

As with all features in this system it can be calibrated by the user to add as much or as little automation as is desired. A highly aggressive setting, for example, will create tight focus even on very rapidly moving objects. A less aggressive setting will create a more naturalistic delay, which may be more suitable to some creative goals.

Data Recording:

As previously mentioned, position and orientation data in this system may be recorded (i.e. stored in a memory 132—see FIG. 1A) in real-time and used later in other post production scenarios.

Enhanced Camera Control:

Using position and orientation data it is possible to fully automate the operation of the camera and the movements of a dolly and or jib arm or camera crane. However, camera operators and cinematographers want to have full control of the subtleties of the final composition. One feature of this system is to fully automate the complex work of camera control and allow the operator to simply move his finger over a video playback screen with a touch screen capability to adjust composition. For example, the automated system may keep the performer dead center on frame, but the operator wishes to frame the performer to the left of frame. By simply dragging a finger from any point on the video image to the left the system will compensate and adjust the performer's placement in frame to the desired composition. In this way framing a rapidly moving object will be as simple as if framing a stationary object. This same adjustment can be made with joystick controls, which are currently used for standard remote camera operation and this would also be a big improvement over current technology. The touch screen drag feature however is more intuitive and requires no training.

Infra Red LED:

The above-described system uses an AC magnetic motion capture system. However, an equally viable alternative, which may be applicable to larger studio configurations, is to use infra-red LED motion tracking systems to capture the same data. While infra-red is line of sight to the sensor cameras, it does not require line of sight between the camera and subject. It is possible to hide small infra-red LEDs in clothing, hair and other objects which will be invisible to the camera. It is also possible to create "smart fabrics" that have infra red patterns stitched into them which can provide the same data.

Differential Global (and Local) Positioning System:

Differential GPS provides almost all of the relative positional data required to operate this system. Augmenting the GPS by accelerating the processing time, "tethering", and adding extra sensory capacity to provide orientation data will make this system fully functional in virtually any outdoor location in the world. Indoor studio applications can be augmented by the development and use of a "local positioning system" which operates on the same principals as Differential GPS but at a much smaller scale and, because "satellites" can be stationary, a much greater accuracy can also be achieved.

Lighting and Other Equipment Control:

Once nodes are defined data can be made available to any number of auxiliary control systems that require accurate pointing, following, or targeting and other qualitative adjustments such as width of light beam, etc.

Sports Training:

Adapting this system to sports training is a relatively simple matter. For example, tethering a tennis ball machine to a software interface that knows the exact position of a player it is possible to program the machine to always play to a player's weakness (backhand) and or to create a more challenging virtual opponent with the machine's ability to fire balls at any speed or angle.

Application for Sight-Impaired Environments:

Another application of the system could be for use in low-light situations or for visually impaired persons. For example, an environment could be mapped as nodes and a visually impaired person could receive various types of feedback regarding their position and orientation, and the position and orientation of objects and people in a room. Another example would be in low-light situations such as an extreme darkroom, where any person could not see his or her environment.

Referring now to FIGS. 7 to 25, components of the graphical user interface (GUI) 64 will be described. The GUI 64 is displayed via the user interface device 42 of user device 40, in order to allow a user to operate the system 10 (see FIGS. 1, 2A and 2B).

Figure 7:
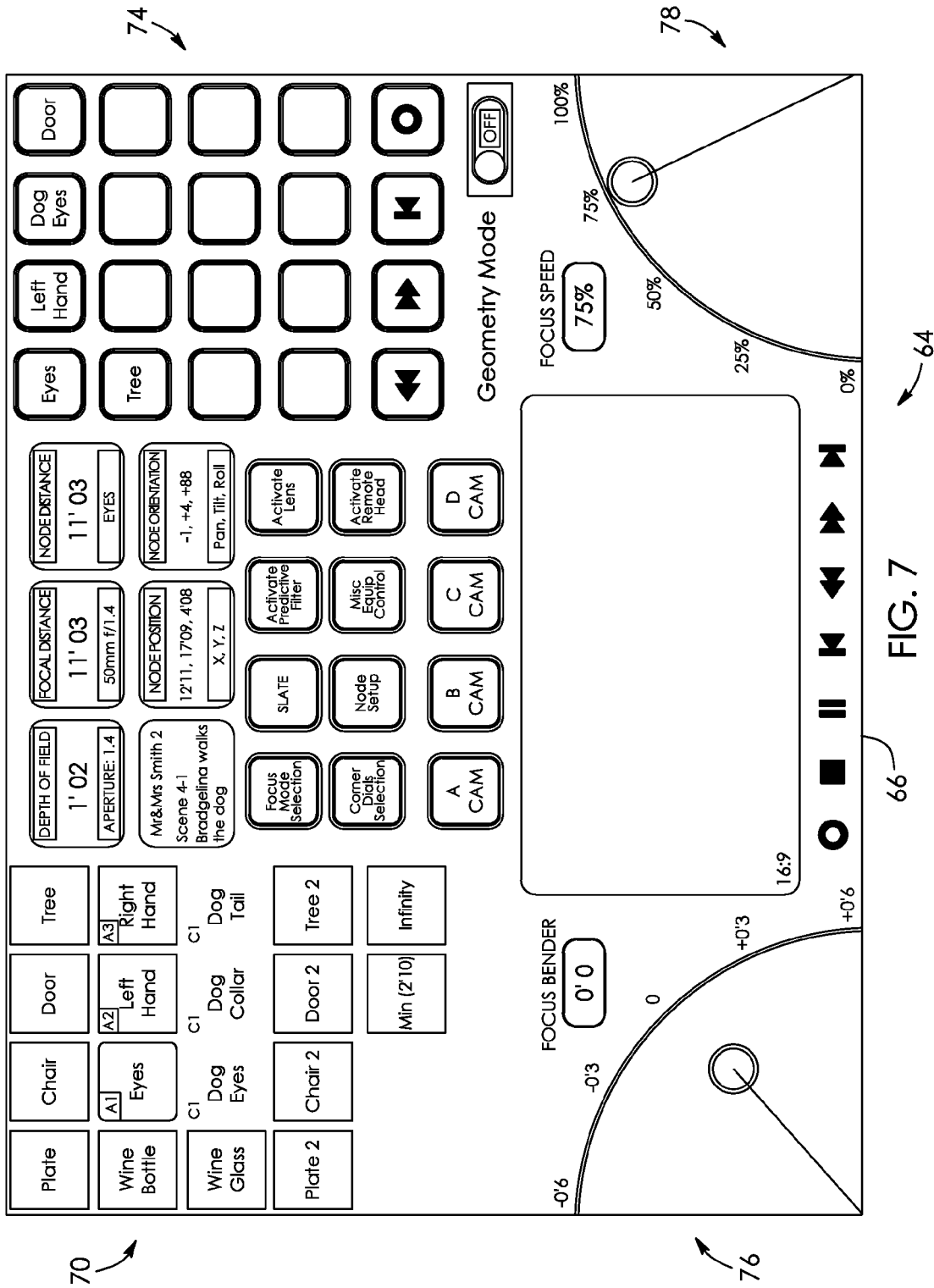
FIG. 7 shows a home screen displayed on a graphical user interface (GUI) of a user device in the system shown in FIG. 1A.

FIG. 7 shows a home screen 66 of the GUI 64.

Figure 8:
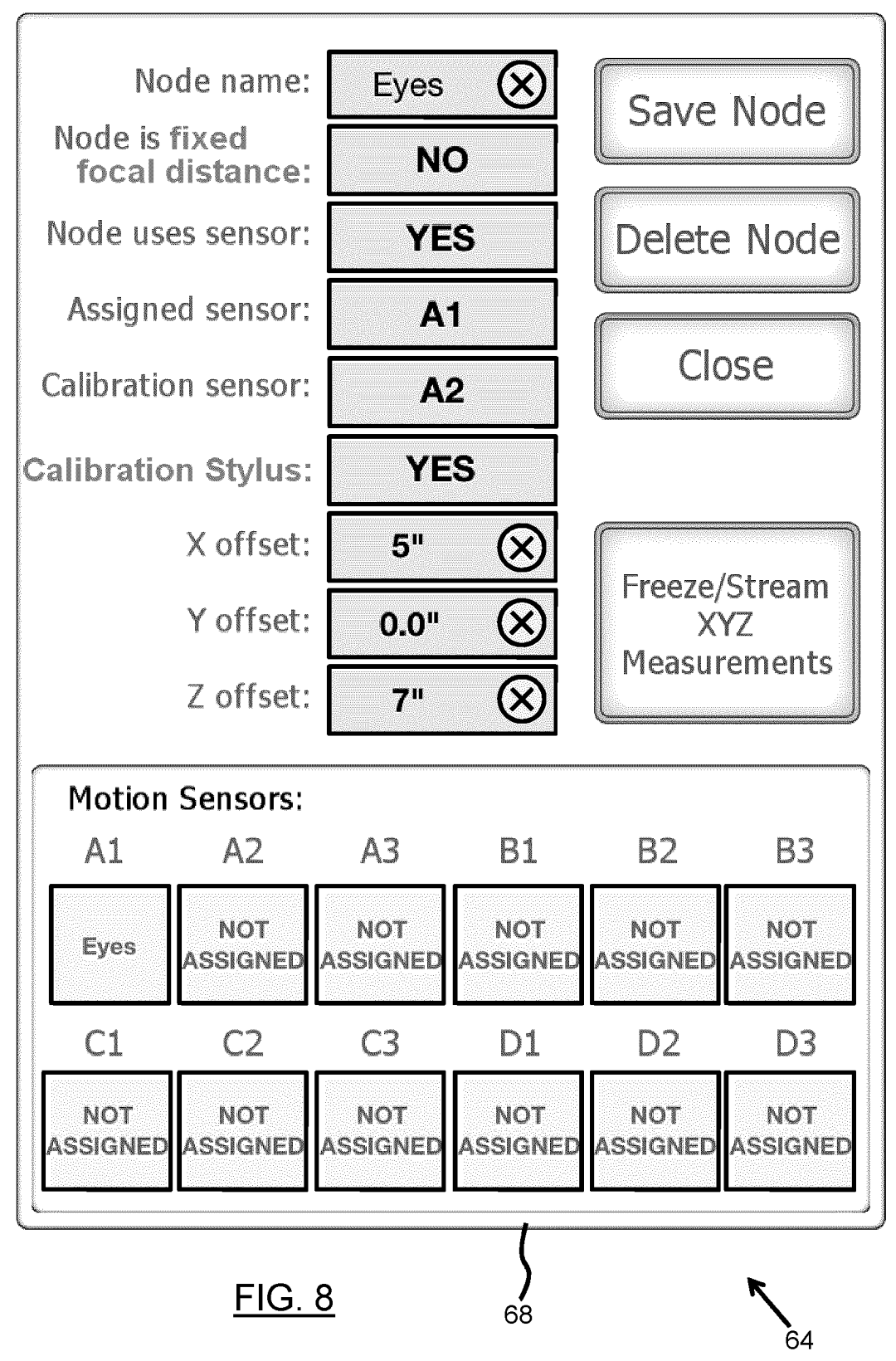

FIG. 8 shows a node creation/modification window 68.

Figure 9:
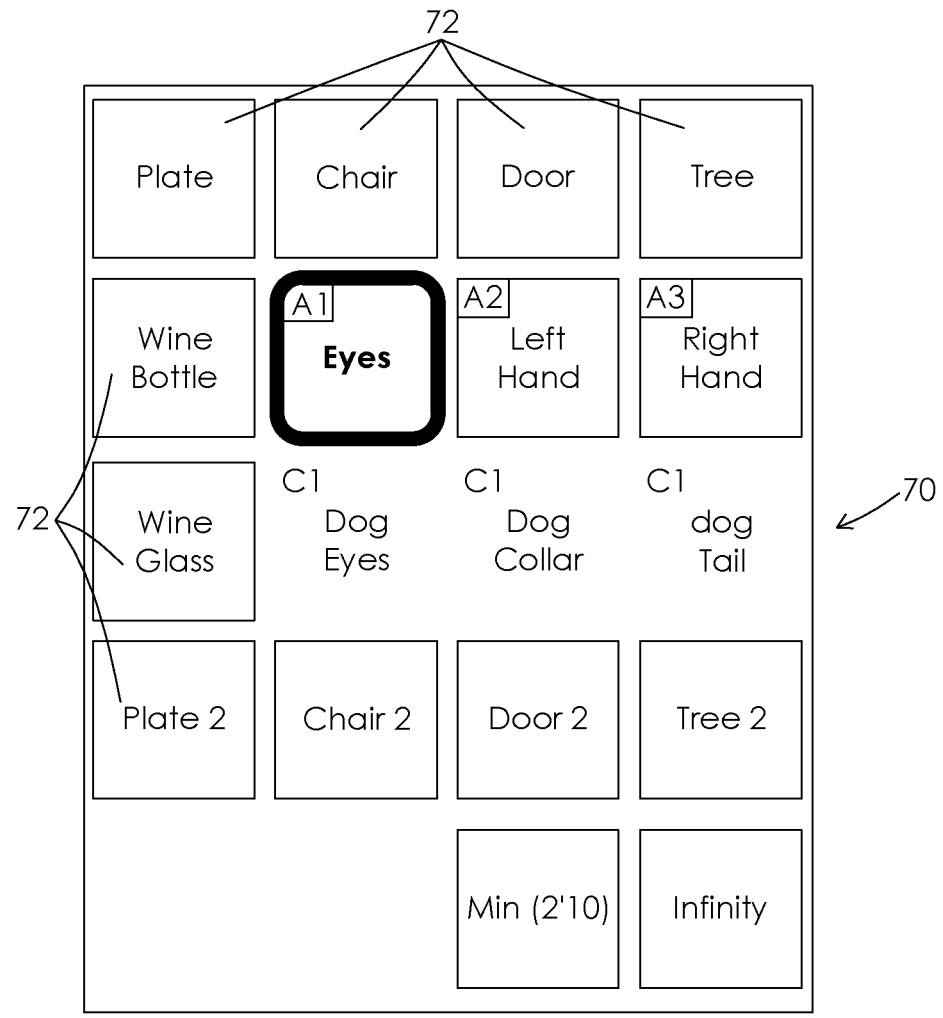
FIG. 9 shows a portion of the home screen shown in FIG. 7, namely a node array defining various nodes.

FIG. 9 shows a portion of the home screen 66 of FIG. 7, namely the node array 70, where a user has created various nodes 72 within the array 70.

Figure 10:
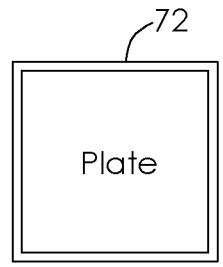
FIG. 10 shows a particular node button of the node array o shown in FIG. 9.

FIG. 10 shows a portion of the node array 70 of FIG. 9, and more particularly, an example of a node 72.

Figure 11:
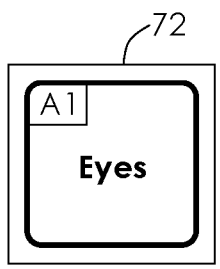
FIG. 11 shows a selected node button of the node array shown in FIG. 9.

FIG. 11 shows another portion of the node array 70 of FIG. 9, and more particularly, a node 72 which is highlighted, indicating that it has been selected by the user by tapping on the node. A node may indicate a variety of information to the user (e.g. if it is associated with a sensor, if the sensor is online, etc.).

Figure 12:
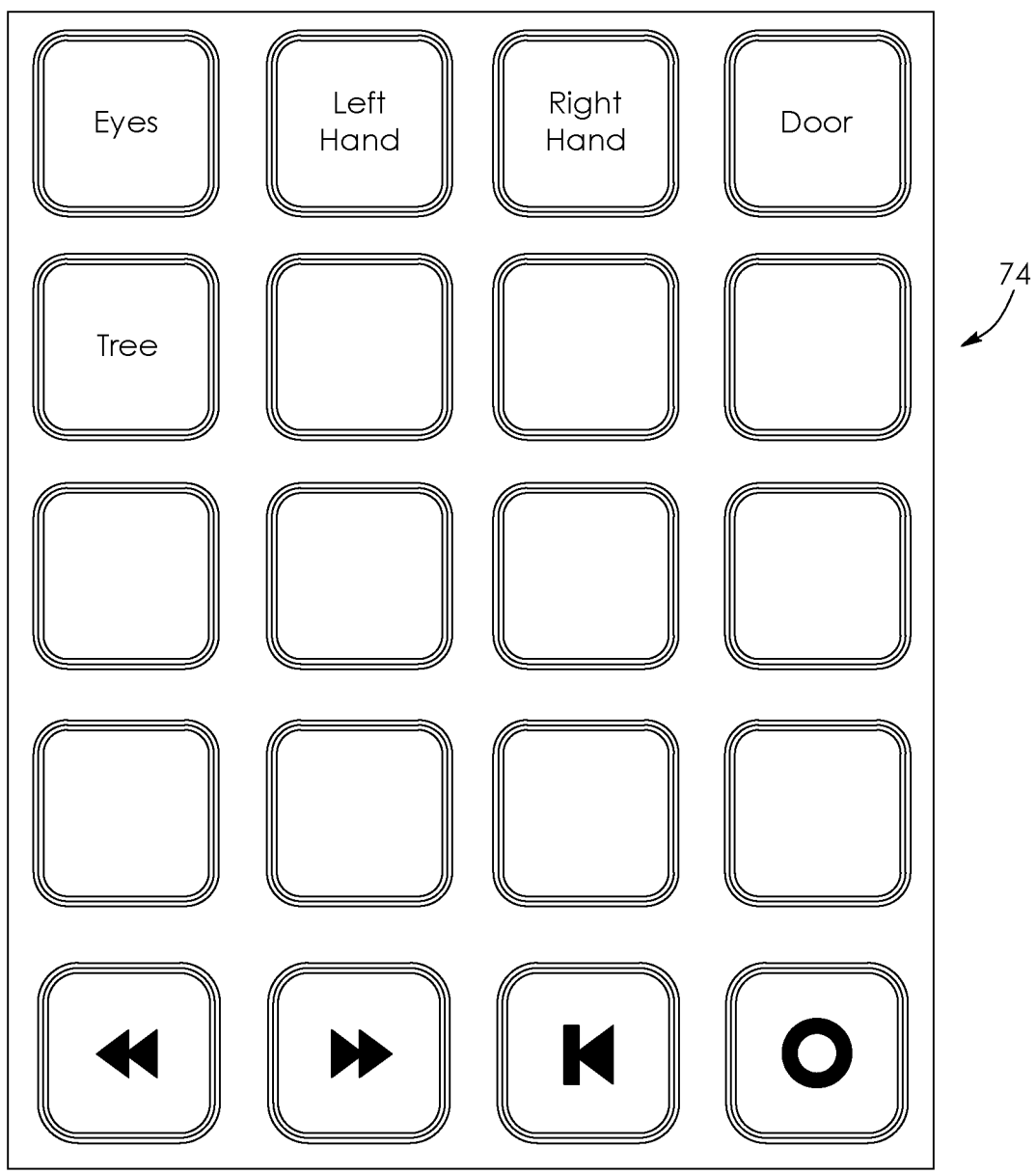
FIG. 12 shows a portion of the home screen shown in FIG. 7, namely showing a sequencer component.

FIG. 12 shows a portion of the home screen 66 of FIG. 7, namely a sequencer 74. A user has recorded various nodes in a specified order to the sequencer 74.

Figure 13:
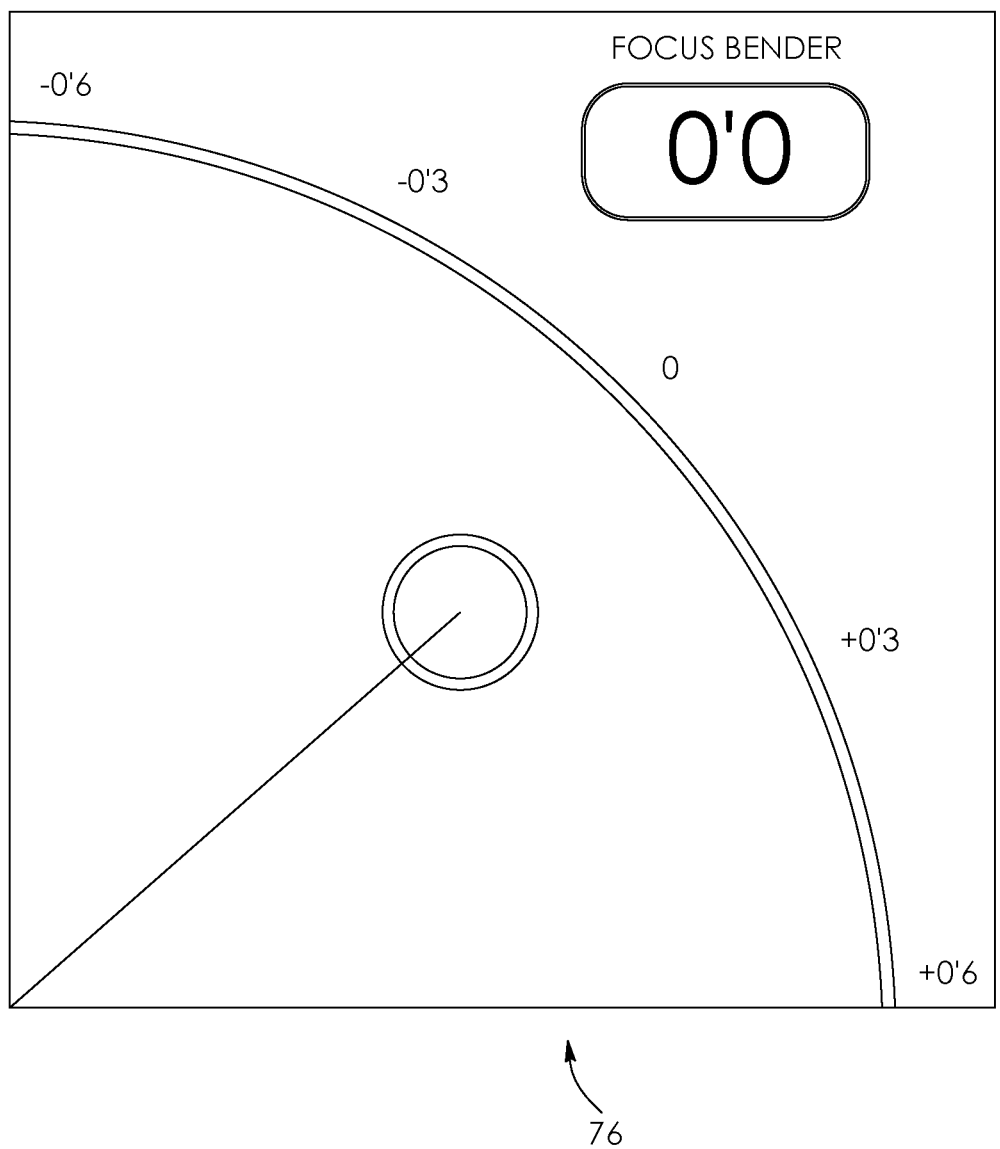
FIG. 13 shows another portion of the home screen shown in FIG. 7, namely showing a corner dial control interface.

FIG. 13 shows another portion of the home screen 66 of FIG. 7, namely exemplifying
a corner dial control interface 76. In this embodiment, the dial is used to fine adjust the focus distance of a lens.

Figure 14:
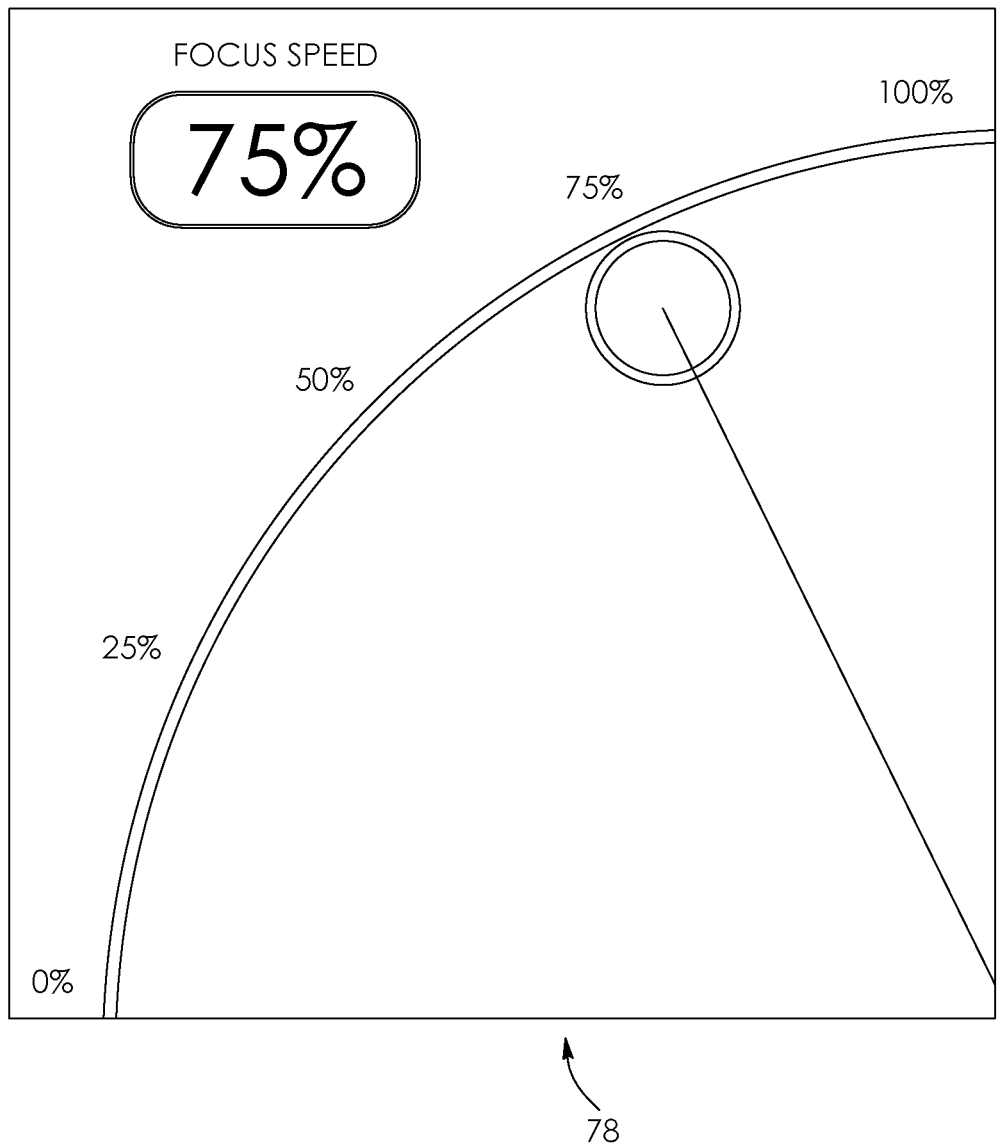
FIG. 14 shows yet another portion of the home screen shown in FIG. 7, namely showing another corner dial control interface.

FIG. 14 shows yet another portion of the home screen 66 of FIG. 7, namely exemplifying another corner dial control interface 78. In this embodiment, the dial is used to control the speed at which the lens pulls focus from one node to another.

Figure 15:
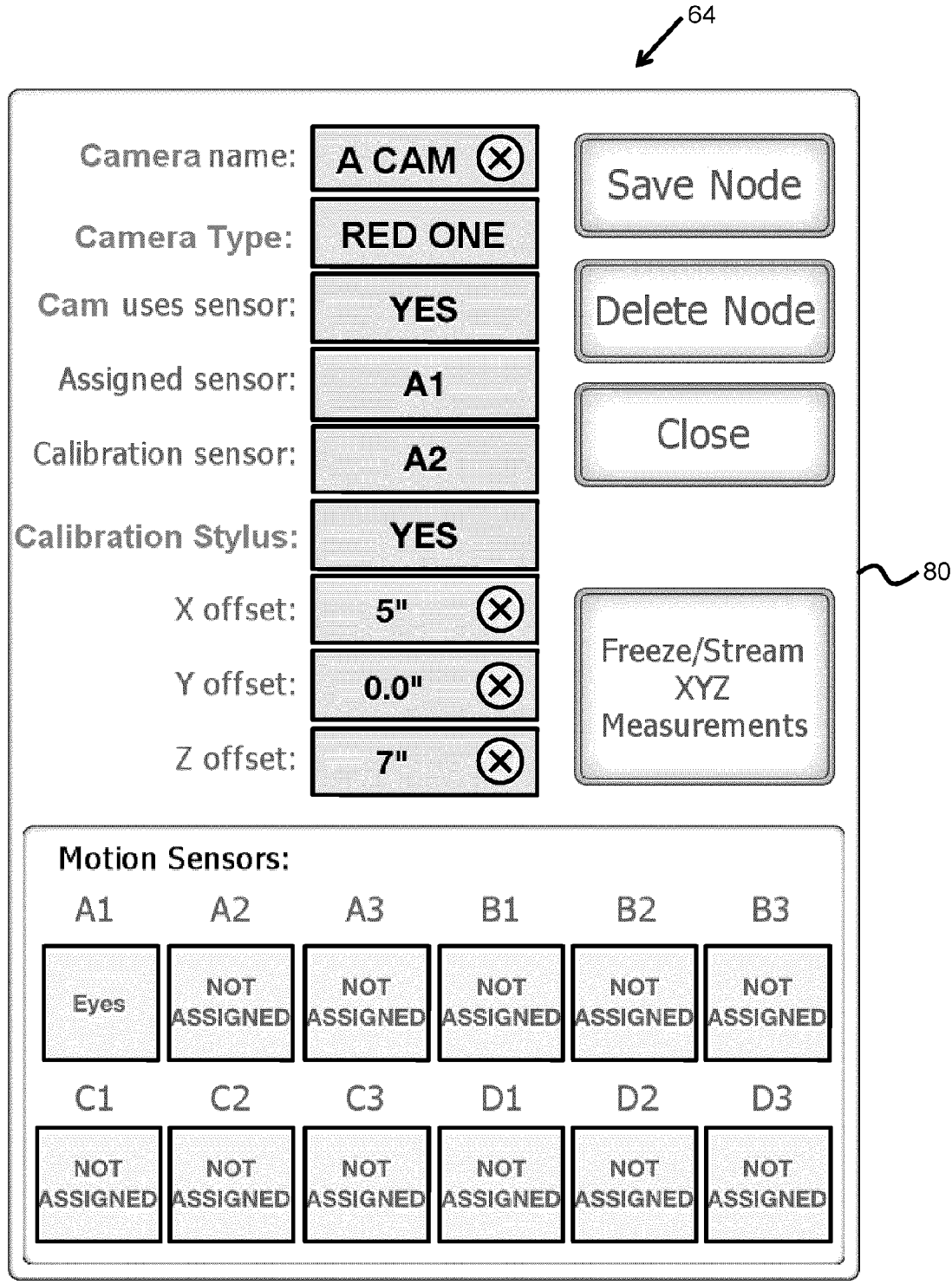
FIG. 15 shows a display screen, according to an embodiment, to be displayed on the user device of the system shown in FIG. 1A, for defining a camera to be controlled.

FIG. 15 shows a window 80 of the GUI 64 for defining a camera.

Figure 16:
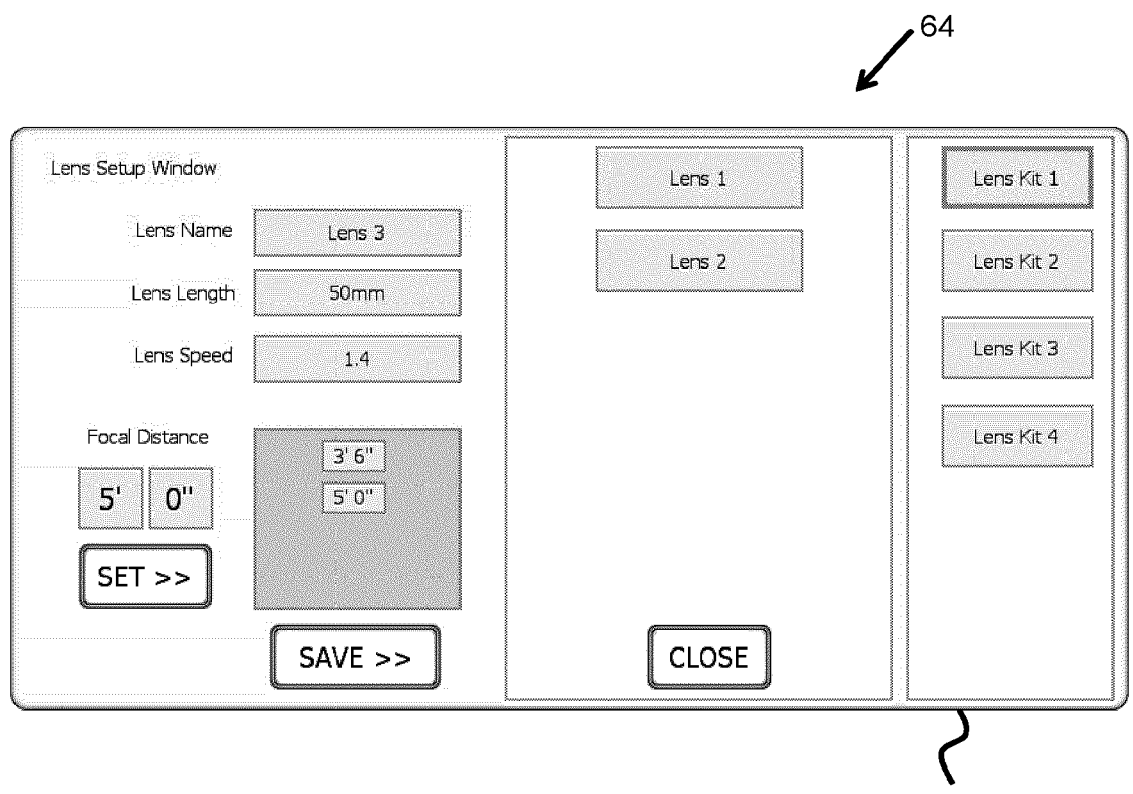
FIG. 16 shows another display screen, according to an embodiment, to be displayed on the user device of the system shown in FIG. 1A, for calibrating lenses of a camera to be controlled.

FIG. 16 shows a window 82 of the GUI 64 for calibrating lenses and selecting which lens is on the camera.

Figure 17:
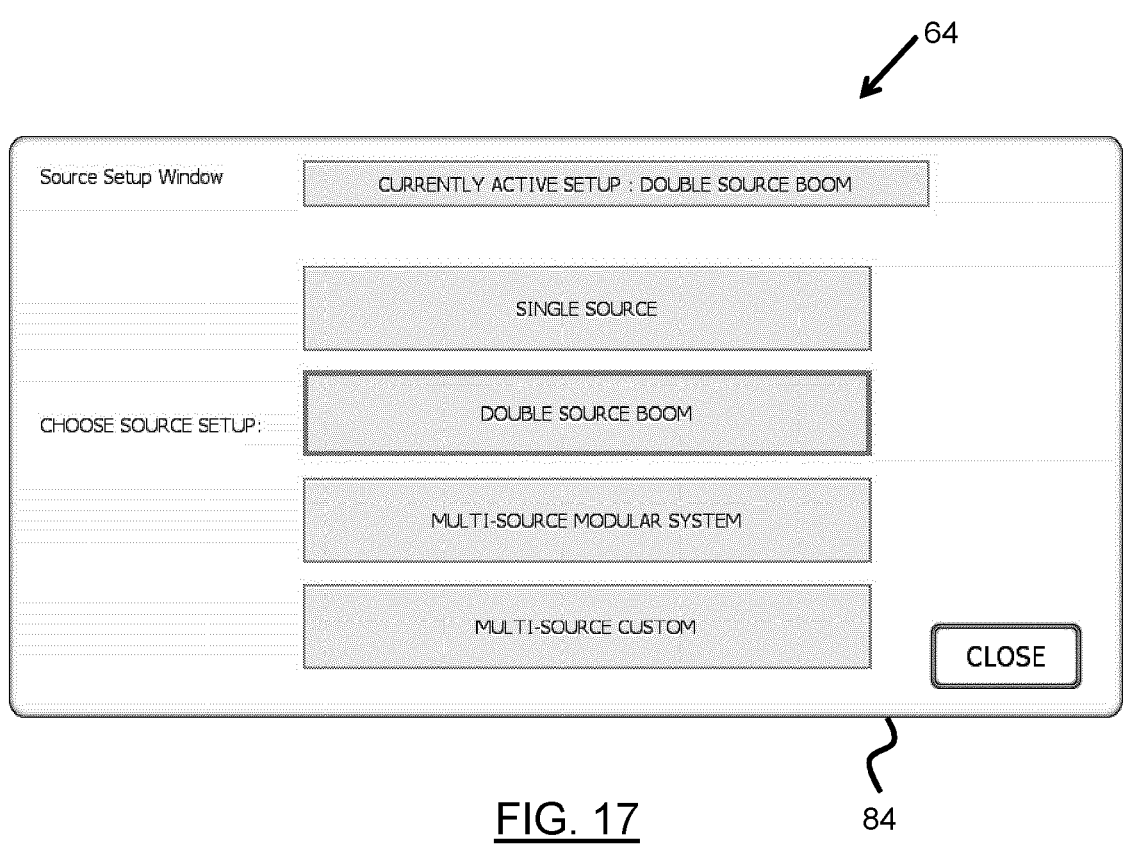
FIG. 17 shows another display screen, according to an embodiment, to be displayed on the user device of the system shown in FIG. 1A, for selecting a configuration of the sensor device.

FIG. 17 shows a window 84 of the GUI 64 for selecting a set-up of the motion tracking system.

Figure 18:
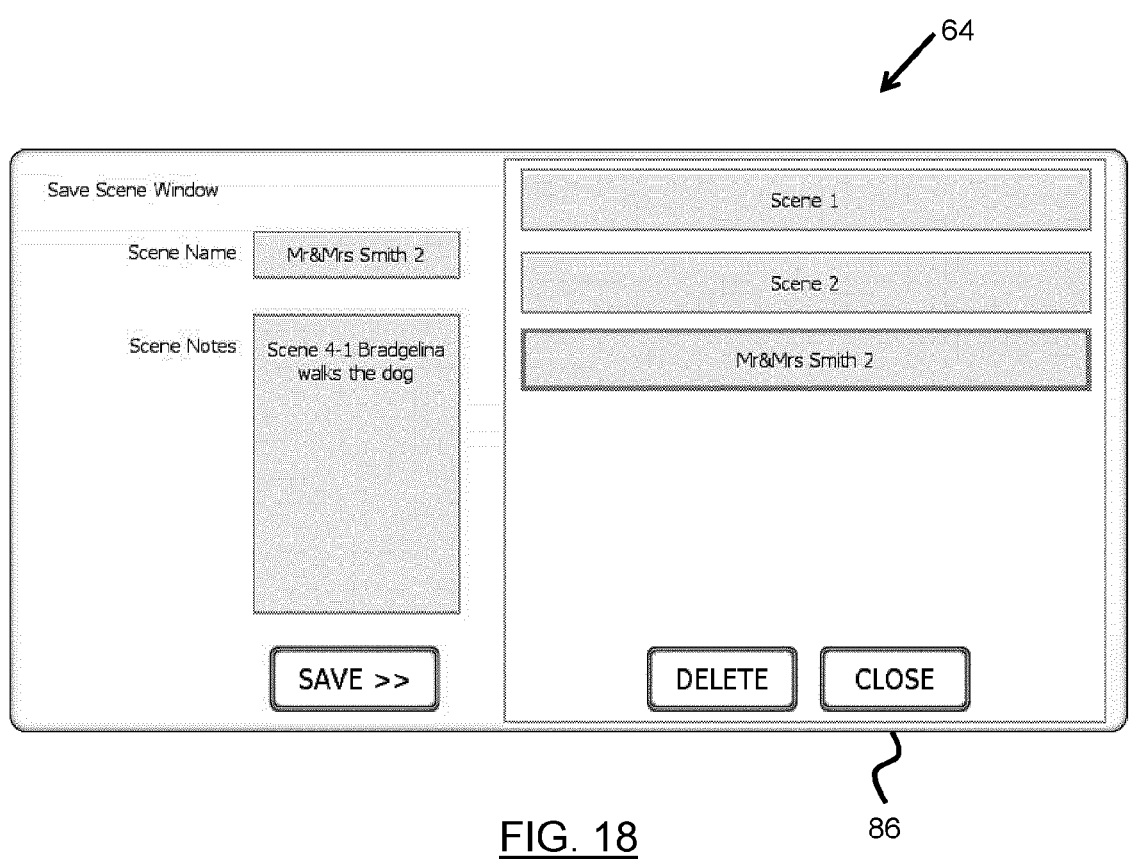
FIG. 18 shows another display screen, according to an embodiment, to be displayed on the user device of the system shown in FIG. 1A, for recording in memory the configuration of the node array and of the sequencer.

FIG. 18 shows a window 86 of the GUI 64 for saving in memory a current state of the application, including the node array 70 and the sequencer 74.

Figure 19:
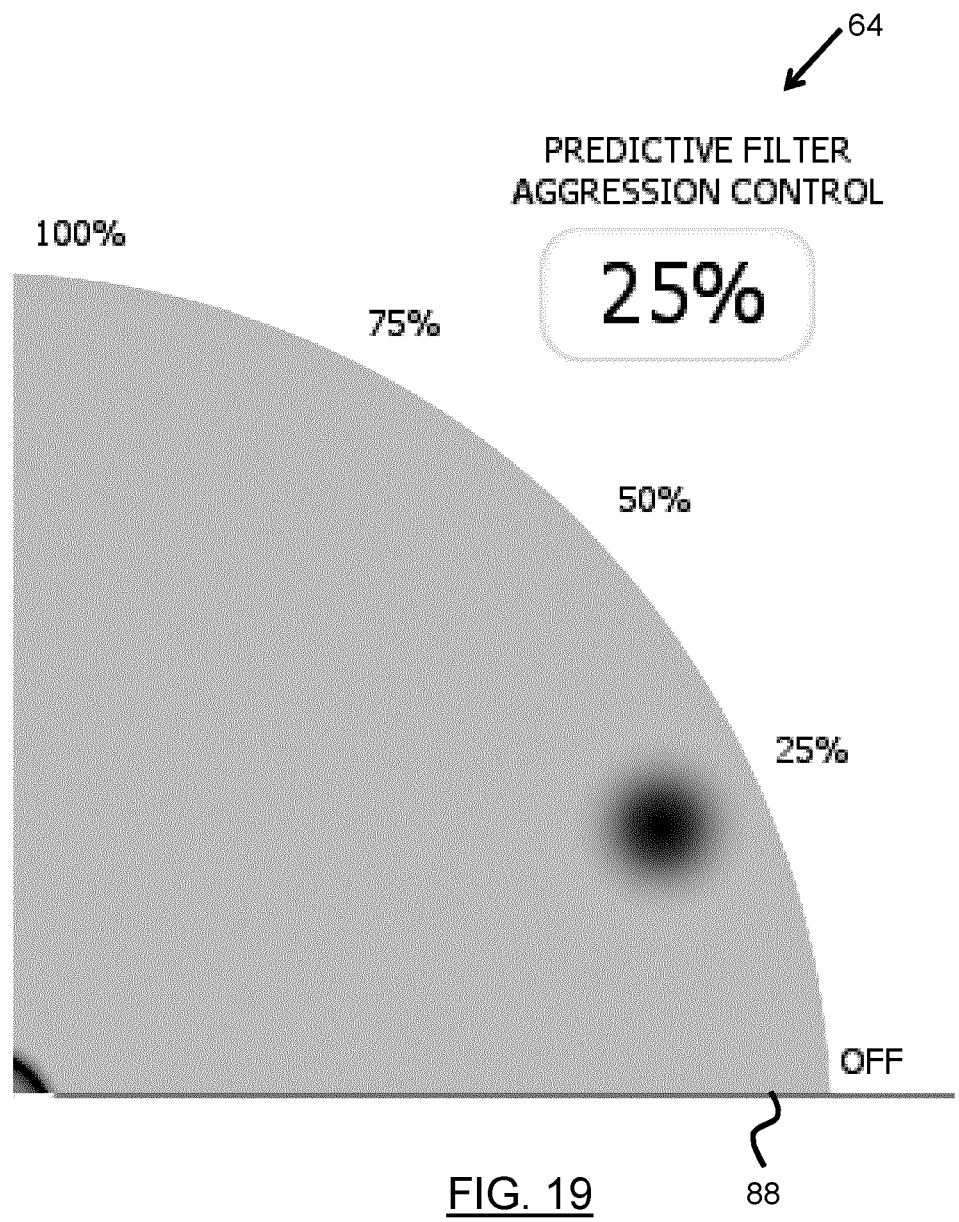
FIG. 19 shows a portion of a display screen, according to an embodiment, to be displayed on the user device of the system shown in FIG. 1A, including a corner controller for adjusting an amount of latency/lag compensation to be applied to the node data.

FIG. 19 shows a portion of a GUI window 64, including a corner controller 88 that allows a user to adjust the amount of latency/lag compensation the system applies to the node data.

Figure 20:
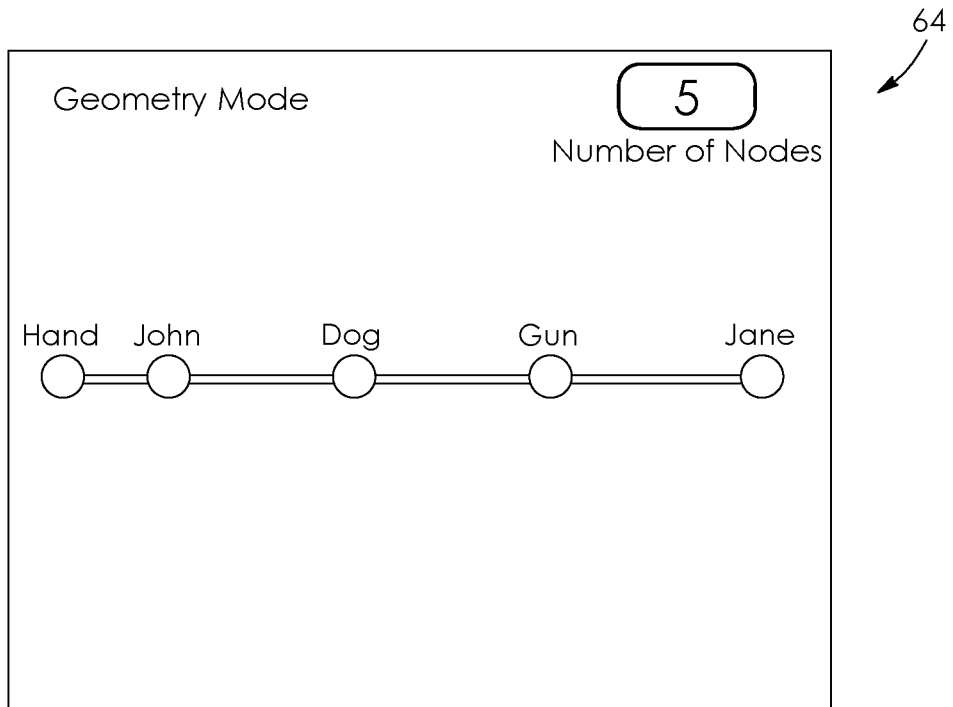
FIG. 20 shows an alternate control display screen, according to an embodiment, to be displayed on the user device of the system shown in FIG. 1A, comprising an interactive graphical representation related to a linear sequencer function.

FIG. 20 shows an alternate control window 90 to GUI 64 ("Full Function Geometry Linear") which allows for interactive graphical representation of the sequencer function. User may pull focus (or make other automatic adjustments) simply by sliding finger from one point (each point representing a node) to the next. The speed at which the user moves finger from one point to another controls the speed of the focus (or other) adjustment to be made.

Figure 21:
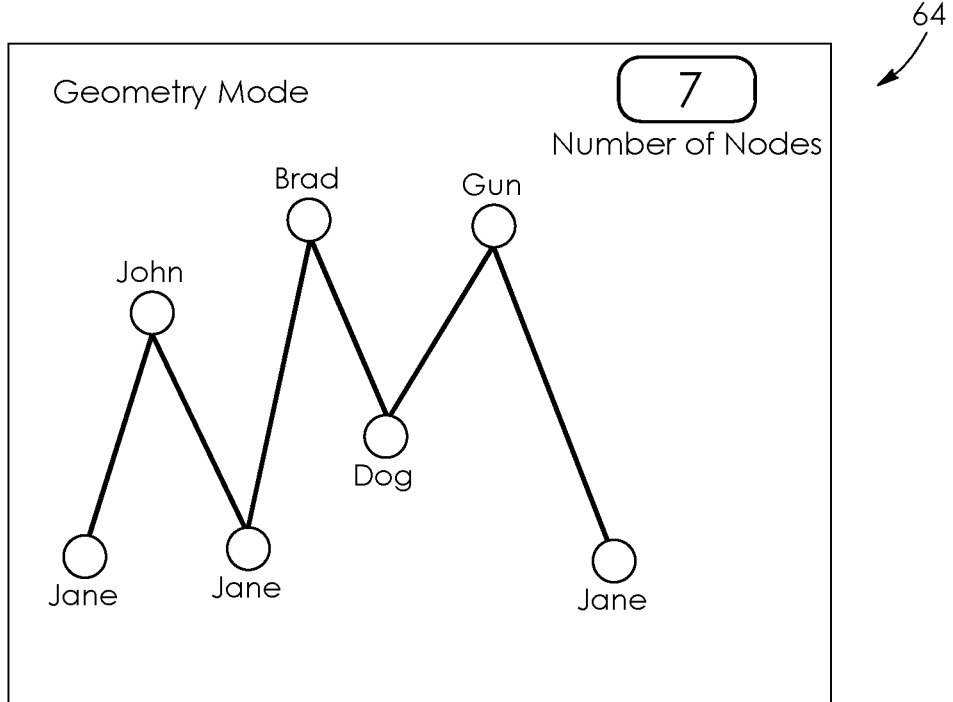
FIG. 21 shows an alternate control display screen, according to an embodiment, to be displayed on the user device of the system shown in FIG. 1A, comprising an interactive graphical representation related to a custom sequencer function.

FIG. 21 shows an alternate control window 92 to GUI 64 ("Full Function Geometry Custom") which allows for interactive graphical representation of the sequencer function. User may determine exact number and position of points on the screen (each point representing a node) and then pull focus (or make other automatic adjustments) simply by sliding finger from one node to the next. The speed at which the user moves finger from one point to another controls the speed of the focus (or other) adjustment to be made.

Figure 22:
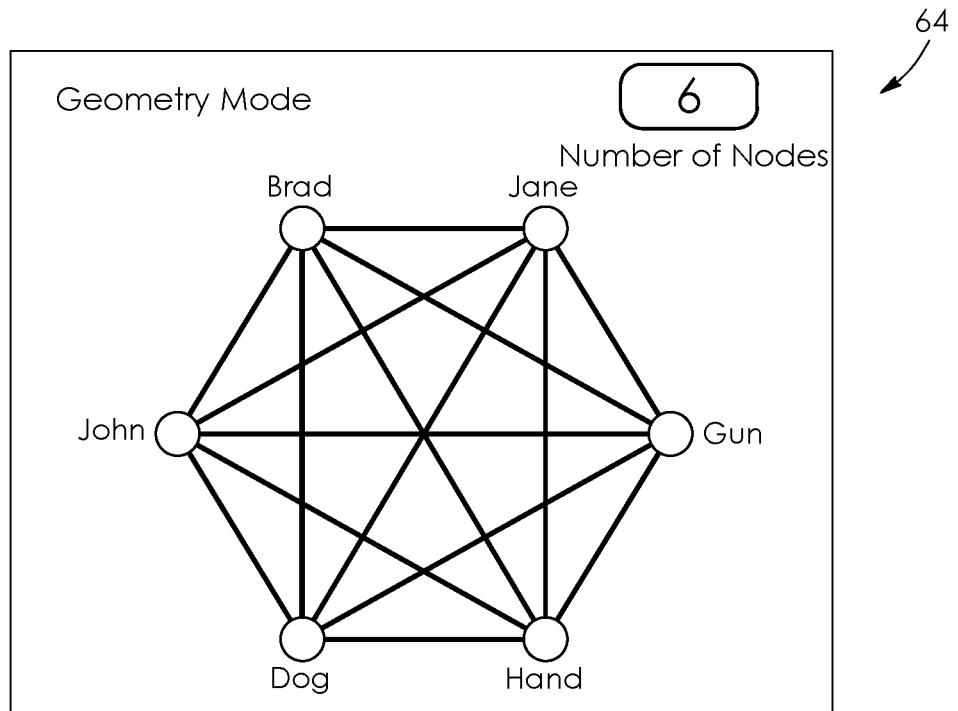
FIG. 22 shows an alternate control display screen, according to an embodiment, to be displayed on the user device of the system shown in FIG. 1A, comprising an interactive graphical representation related to a free sequencing function.

FIG. 22 shows an alternate control window 94 to GUI 64 ("Full Function Geometry 6 Node") which allows for interactive adjustments between any 6 points, each point representing a node. The advantage of this configuration is that no pre-determined sequence is required. The speed at which the user moves finger from one point to another controls the speed of the focus (or other) adjustment to be made.

Figure 23:
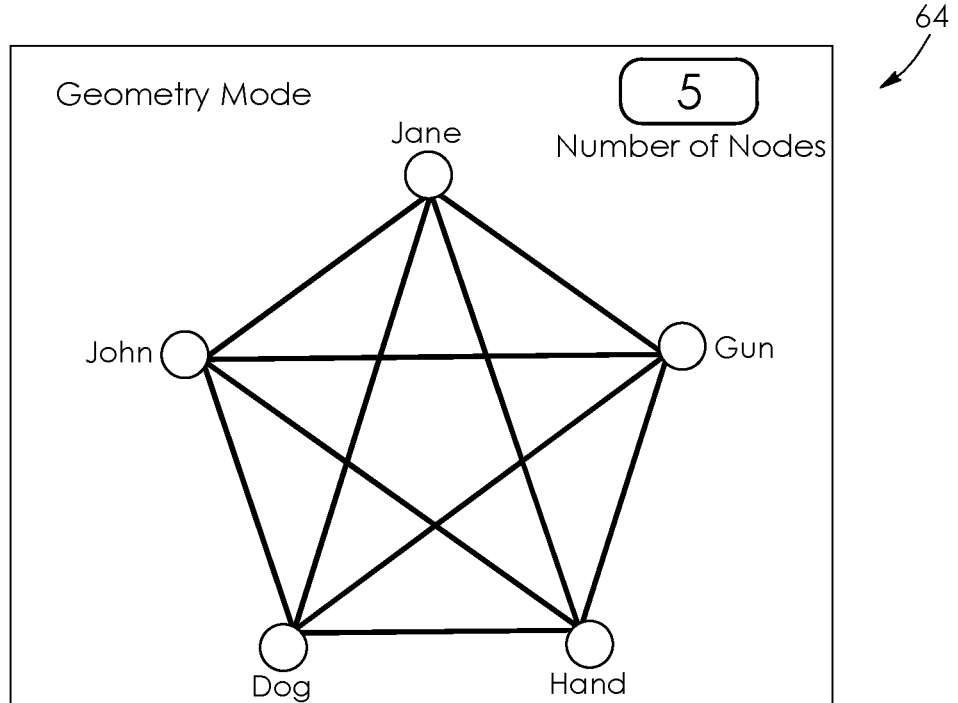
FIG. 23 shows another control display screen, according to an embodiment, to be displayed on the user device of the system shown in FIG. 1A, comprising an interactive graphical representation related to a free sequencing function.

FIG. 23 shows an alternate control window 96 to GUI 64 ("Full Function Geometry 5 Node") which allows for interactive adjustments between any 5 points, each point representing a node. The advantage of this configuration is that no pre-determined sequence is required. The speed at which the user moves finger from one point to another controls the speed of the focus (or other) adjustment to be made.

Figure 24:
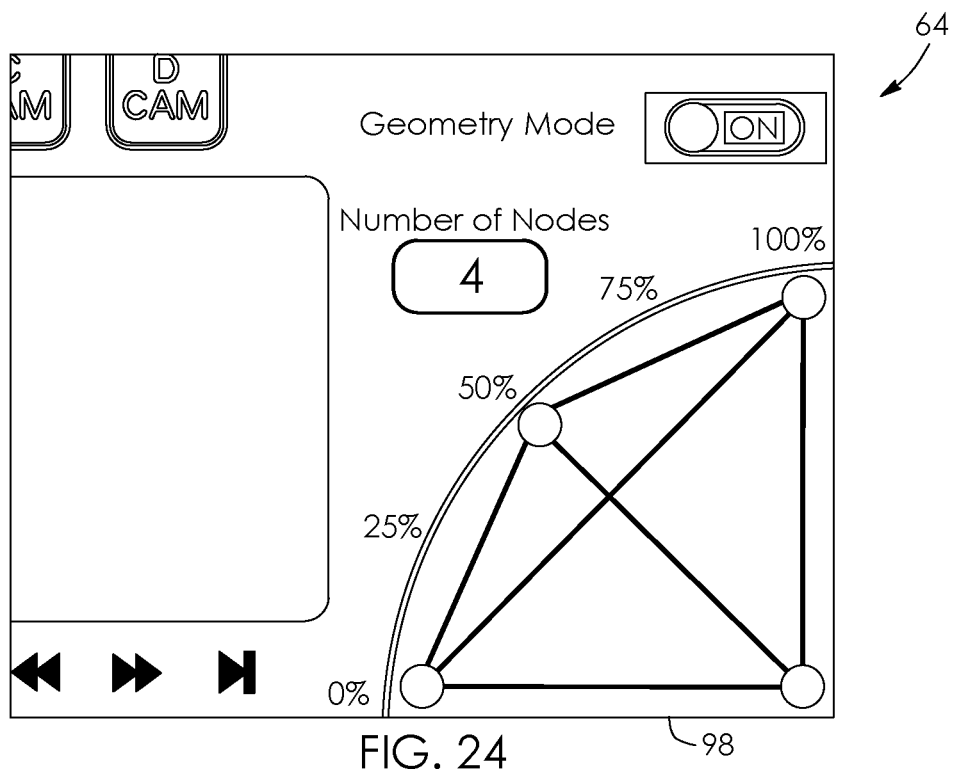
FIG. 24 shows a portion of a home screen, according to an embodiment, to be displayed on a graphical user interface (GUI) of a user device in the system shown in FIG. 1A, namely a 4-node Geometry controller feature.

FIG. 24 shows a detail 98 ("Corner Geometry 4 Nodes") of the corner controller 88 of FIG. 19, in the main control window on GUI 64 which has multiple functions. This function shows how it can be used as an easily controlled graphical representation when four nodes are used. It allows interactive adjustment between four points. The advantage of this configuration is that no pre-determined sequence is required and it is easily operated by the right (or left) thumb in the main GUI 64 window. The speed at which the user moves finger from one point to another controls the speed of the focus (or other) adjustment to be made.

Figure 25:
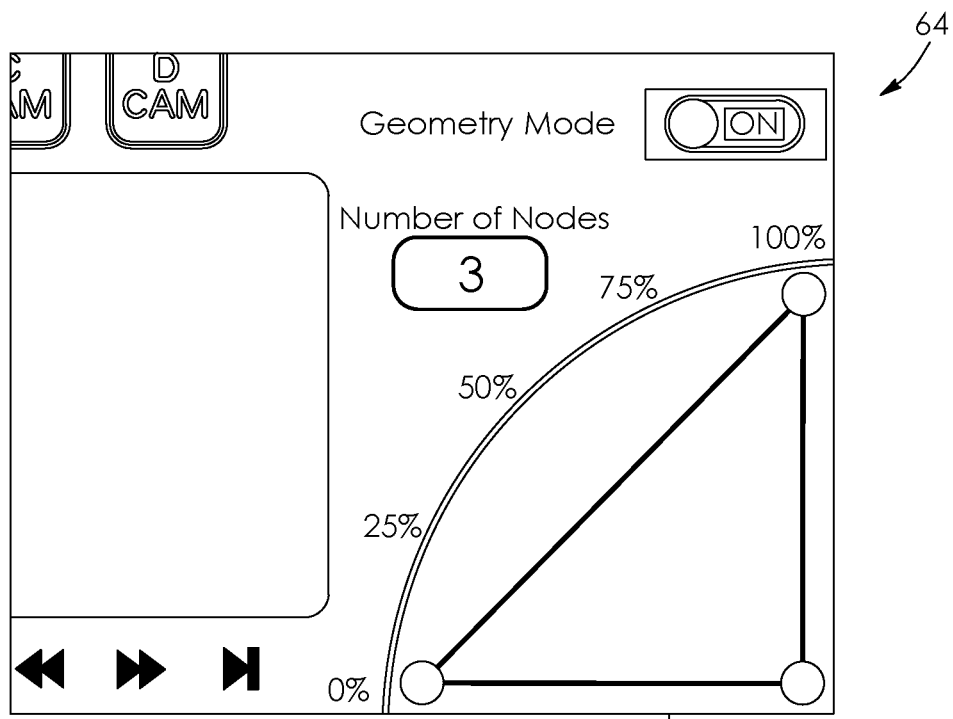
FIG. 25 shows a portion of a home screen, according to an embodiment, to be displayed on a graphical user interface (GUI) of a user device in the system shown in FIG. 1A, namely a 3-node Geometry controller feature.

FIG. 25 shows a detail 100 ("Corner Geometry 3 Nodes") of the corner controller 88 in the main control window on GUI 64 which has multiple functions. This function shows how it can be used as an easily controlled graphical representation when three nodes are used. It allows interactive adjustment between three points. The advantage of this configuration is that no pre-determined sequence is required and it is easily operated by the right (or left) thumb in the main GUI 64 window. The speed at which the user moves finger from one point to another controls the speed of the focus (or other) adjustment to be made.

The following list provides additional features, components, uses, etc. in accordance with embodiments of the present invention:

- data streams and features of this system lend themselves for use in post production. All data and video feeds can be stored and immediately replayed (e.g. for each 'take' on a film set) and/or stored for post production (e.g. used for CGI). This includes camera movements/orientations, node movements/orientations, and equipment control.
- data streams and features of this system lend themselves for use in virtual and augmented reality environments. All data and video feeds can be transmitted, stored, and immediately replayed.
- data streams and features of this system lend themselves to interoperation of various hardware. For example, aperture and light dimming can be linked to each other and preprogrammed so that as the aperture is adjusted to change the depth of field, the lighting can be automatically simultaneously dimmed or brightened so the audience experiences changing depth of field without experiencing a change in lighting. Such interoperability pertains to all equipment without limitation.

the system design, according to embodiments, lends itself to interoperation of multiple operator interface devices (e.g. iPads, iPhone, Ipod touches) running the app and controlling all equipment types. Along with this interoperability, each interface devices can send and receive data with one another. For example, if a operator taps a node to focus his or her camera on one object, that focus decision can be immediately indicated on the device of another focus puller controlling another camera, and also on the devices of various other crew members including the director and producer.

the system design, according to embodiments, lends itself to extremely flexible multicam functionality. In the example of focus, one iPad can control multiple cameras, and multiple iPads can control multiple cameras simultaneously. One iPad can control multiple cameras simultaneously by tapping a node, or cameras can be selected individual control. A second copy of the node array can also also temporarily replace the sequencer graphic for control of one or more secondary cameras simultaneously to the permanent node array. The video feed section of the app can be made to switch into split screen (e.g. split screen for 2 cameras, or 4-way split screen for 4 cameras) in order to monitor all focusing activity.

advanced hardware and software designs focus on minimizing the latency of the system to the order of milliseconds (e.g. interrupts, multiple cores, multi-threaded software, etc.).

due to the low latency and responsiveness of the system, a function can allow the operator to actually slow down the autofocusing responsiveness so as not to look too 'robotic'.

a mechanical input device (e.g. a digital follow focus dial attached to an iPad) can be linked to any elements of the software's graphical user interface (e.g. sequencer).

'malleable' touchscreens that can create the feeling of textures, grooves, etc. via electrical charges on screen surfaces lend themselves to this system. For example, the graphical lines and nodes in the 'Geometric Slider' function could turn into grooves for improved operability including limiting the operator's reliance on look at the touchscreen.

recording and playback of the built-in video feed display is extremely useful for both focus pullers, directors of photography, directors, etc. For example, a focus puller could easily assess the quality of the focus in the last 'take' or at the end of a 'shot' or the end of the day.

touching an area of the video feed can select a node for fucusing and/or control other equipment functions, like remote head pointing, lighting, etc.

a sensor and transmitter can be placed inside free objects. For example, a sensor and transmitter could be placed in a custom basketball in a way that didn't affect the ball's mass or center of mass, in order to focus on the ball during a basketball game).

along with the 'scene saving' function that saves the state of the app, a node manager can allow the operator to save groups of like-nodes (e.g. all the parts of a car can be defined as nodes and reloaded at any time in the future to re-use the same car or to facilitate node creation for a new car).

equipment control events can be triggered (hardware and/or software triggers) based on the coordinate position of a node.

many 'intelligent' uses of node data are possible. For example, an indication can alert the operator when a node is nearing or enters the camera's field of view (frame). In this example, a node could be preprogrammed to automatically snap into focus when it enters the frame.

the motion tracking data stream can be filtered using many mathematical approaches. For example, noise in the data stream can be quantified to determine when the data becomes suspect or unusable. This data can be fed into the 'Manual Overrides and Automatic Handoff' software functions. Many filters can also be applied to the data stream to control the level of dampening, etc.

when the node sequencer is in 'neutral', the 2 (line), 3 (triangle), or 4 (square) geometry nodes are all set to a green colour. This way when the sequencer is put into 'forward' or 'reverse', the next node will be outside of the 2, 3, or 4 group, and the next logical node in the sequence will become the sole green node.

a software function can allow the operator to quickly correct for slight errors in a node's tip offset by viewing the node through the camera and then manipulating the focus fine adjust function until the node is focused sharply. At this moment, the operator can trigger the system to automatically recalculate the node's tip offset (via quaternion calculations).

pre-recorded motion tracking data (e.g. earthquake movements) can be fed into the system to move camera and equipment in order to mimic the pre-recorded movements. This technique may heighten an audience's 'natural experience' (e.g. earthquake movements, vehicle in rough terrain, etc.).

specific (and difficult) predefined equipment actions can be automated and/or facilitated (e.g. a Hitchcock zoom using a handheld camera, a camera rotating in sync with a trapeze artist, etc.).

effects relating to music content are possible including feedback loops (e.g. focus in and out in time with the beat of a song or camera position/pointing in relation to a beat, including live performance).

the entire system can be 'scriptable' so that any user interactions with software can be recorded and automated.

various accessories can be used for sensor placement on objects. For example, sensors can be placed in straps to put on an actors, or can be snapped into on various mounts for easy placement/attachment.

the source setup function can include a 3D modular source building function for setups that use the modular pole-connected source system accessory. In this function the operator can quickly build a 3D representation of the modular setup they have manually constructed. The software can then instantly calculate the position and orientation of all sources, since the lengths of the poles and angles of the sources are predefined by way of the physical design of the modular source system accessory.

for the modular source system, connecting poles can be taken away after setup without moving the sources. This allows for quick, non-tethered source placement without the need to measure source position or orientation, as these are calculated in the iPad app's 3D modular source building function.

along with servo motor control of lens rings, the internal electronics of certain camera lenses can be accessed to directly control focus, aperture, zoom, removing the servo motor requirement.

the system software allows for complete control of the configuration of the motion tracking system.

an accessory is a sensor calibration 'body cap' tool that would fit onto the lens mount of cameras for a precise measurement. This would allow for very precise measurement of the focal plane centre which is important for visual effects work because it makes the camera data "nodal".

Embodiments of the present invention are advantageous in that using a real-time stream of three-dimensional position and orientation data to adjust lens functions, composition, camera positioning, lighting, and sound greatly facilitates and expands on the functionalities available to film makers and moving and/or still image content creators.

The use of nodes in the context of cinematic control, in accordance with embodiments of the present invention, present numerous advantages including:

1) The node system allows for predefining multiple moving nodes (virtually all other camera/focus systems don't, but Pictorvision Eclipse does use GPS for a coarser application http://www.pictorvision.com/aerial-products/eclipse/).

2) The node system allows for true auto-tracking of multiple moving nodes (possibly all other camera/focus systems don't; some make an attempt by having a human do the tracking; Pictorvision Eclipse may have only one moving node; an example a "true auto-tracker" for lighting might be: http://www.tfwm.com/news-0310precision).

3) The node system provides three-dimensional positional data (as opposed to distance which is far less useful, unlike almost all other systems).

4) A property of the nodes used is position and orientation, allowing to define points on subjects/objects instead of general 'areas' (unlike possibly all other camera/focus systems; without this, other systems cannot apply offsets to define a node anywhere on an object, e.g. focusing on eyes).

5) Position and orientation allow for tying control to subject/object angles e.g. switch from an actor's right eye to their left eye when their head is at a certain angle to camera (no other system can do this).

6) The node system provides extremely high accuracy (less than 1 cm in many situations) unlike possibly all other auto-tracking systems (thanks to orientation and offsets providing an increased level of control/focus).

7) The node system further provides extremely high frequency (120 Hz) unlike possibly all other auto-tracking systems (e.g. gps systems, active face detection likely don't have this).

8) The node system further provides is low latency (10 ms). This level of latency doesn't inhibit 'cinematic' control for most situations (again, many systems lack this).

9) The node system provides predictive/corrective functions, considerably reducing latency.

10) The node system requires no 'line of sight' requirement, i.e. the nodes use sensors placed on the actor/object so a laser or sound wave doesn't have to bounce off the actor. Facial recognition also requires line of sight obviously. Another benefit of sensors in this regards is constant node data. For example, if an actor jumps out from behind a bush, he/she is already 'instantly' in focus as opposed to line of sight systems that have to react to the new presence of the actor.

11) The node system continues to function in a moving environment. For example, if a source is mounted to a handheld camera system (or is used with the source boom pole accessory), the system continues to function in the vicinity of the camera operator no matter where he/she walks. Similarly, the system works in a moving vehicle, for example on a moving train.

12) Moreover, the node system is a portable system.

The above-described embodiments are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The invention claimed is:

1. A system for controlling a setting of an equipment related to image capture, comprising:

a sensing device configured to capture position data and orientation data located at a first location on an object, the three-dimensional position data and orientation data representing a physical location and an orientation of the first location on the object;

a processor being in communication with the sensing device, the processor being configured to determine position information of a region of interest to be treated by the equipment from the position data and orientation data captured by the sensing device based on a predetermined positional offset of the region of interest from the first location on the object, the region of interest and first location on the object being located at different locations; and an output port integrated with the processor, configured to output a control signal directed to the equipment, in order to control in real-time the setting of the equipment based on said position information of the region of interest; and wherein the object is a human;

wherein the first location is a first body part of the human being located on the back of the human; and wherein the second location is a second body part of the human being a facial feature of the human.

2. A system according to claim 1, further comprising:

a controller being in communication with the output port and being configured to control the setting of the equipment with said control signal.

3. A system according to claim 1, further comprising said equipment, wherein the setting comprises at least one of: a focus setting of a camera, a zoom setting of the camera, an aperture setting of the camera, an inter ocular lens angle setting of the camera, a pan setting of the camera, a tilt setting of the camera, a roll setting of the camera, a positional setting of the camera, a lighting equipment control setting, and a sound equipment setting.

4. A system according to claim 1, wherein the sensing device is a visibility independent sensing device.

5. A system according to claim 1, wherein the sensing device comprises a transmitter, the system further comprising a receiver being in communication between the transmitter and the processor.

6. The system of claim 1, wherein the first location is located on the back of the head of the human and the second location corresponds to an eye of the human.

7. The system of claim 1, wherein the first location is located on the back of the neck of the human and the second location corresponds to an eye of the human.

8. The system of claim 1, wherein the second location corresponds to one of a left eye and a right eye of the human.

9. The system of claim 1, wherein the equipment related to image capture is a camera; and
wherein the control signal directs the camera to focus on the second location.

10. A system according to claim 1, further comprising a data processing unit embedding said processor and a user device being in communication with the data processing unit, the user device comprising a user interface.

11. A system according to claim 10, wherein the user device is in communication with the data processing unit over a wireless communication network.

12. A non-transitory computer-readable storage having stored thereon data and instructions for execution by a computer for controlling a setting of an equipment related to image capture, said data and instructions comprising:
code means for receiving position data and orientation data of a sensing device located at a first location on an object, the three-dimensional position data and orientation data representing a physical location and an orientation of the first location on the object;
code means for determining position information of a region of interest to be treated by the equipment from the position and orientation data captured by the sensing device based on a predetermined positional offset of the region of interest from the first location on the object, the region of interest and the first location on the object being located at different locations on the object; and
code means for outputting a control signal directed to the equipment, in order to control in real-time the setting of the equipment based on said position information of the region of interest; and
wherein the object is a human;
wherein the first location is a first body part of the human being located on the back of the human; and
wherein the second location is a second body part of the human being a facial feature of the human.

13. A method for controlling a setting of an equipment related to image capture, comprising:
a) capturing three-dimensional position data and orientation data at a sensing device located at a first location on an object, the three-dimensional position data and orientation data representing a physical location and an orientation of the first location on the object;
b. determining, by means of a processor, position information of a region of interest to be treated by the equipment from the position data and orientation data having been captured based on a predetermined positional offset of the region of interest from the first location on the object, the region of interest and the first location on the object being located at different locations; and
c. outputting, via an output port of the processor, a control signal directed to the equipment, in order to control in real-time the setting of the equipment based on said position information of the region of interest; and
wherein the object is a human;
wherein the first location is a first body part of the human being located on the back of the human; and
wherein the second location is a second body part of the human being a facial feature of the human.

14. A method according to claim 13, further comprising:
a) controlling, by means of a controller, said setting of the equipment with said control signal.

15. A method according to claim 13, wherein the setting comprises at least one of: a focus setting of a camera, a zoom setting of the camera, an aperture setting of the camera, an inter ocular lens angle setting of the camera, a pan setting of the camera, a tilt setting of the camera, a roll setting of the camera, a positional setting of the camera, a positional setting of the camera, a lighting equipment control setting, and a sound equipment setting.

16. The method of claim 13, wherein the first location is located on the back of the head of the human and the second location corresponds to an eye of the human.

17. The method of claim 13, wherein the first location is located on the back of the neck of the human and the second location corresponds to an eye of the human.

18. The method of claim 13, wherein the second location corresponds to one of a left eye and a right eye of the human.

19. The method of claim 13, wherein the equipment related to image capture is a camera; and
wherein the control signal directs the camera to focus on the second location.

20. A method according to claim 13, wherein the region of interest of the determining step (b) includes one or more node, the determining step (b) comprising, for each node:
i) determining position information of said node; and
ii) calculating a distance between the equipment and the node, and
wherein the control signal of the outputting step (c) is generated based on the distance calculated at step (b).

21. A method according to claim 20, wherein the position information of each node in the determining step (b)(i) comprises Euclidean space coordinates of the node $(x_1, y_1, z_1)$, and
wherein the calculating step (b)(ii) comprises:
receiving position information of the equipment in Euclidean space coordinates $(x_2, y_2, z_2)$; and
calculating the distance between the position information of the equipment and the position information of the node from the following Pythagorean theorem:

$$\text{distance} = \sqrt{(x_1-x_2)^2 + (y_1-y_2)^2 + (z_1-z_2)^2}.$$

22. A method according to claim 21, wherein the determining step (b)(i) comprises applying a tip offset from the position data and orientation data of the sensing device of the capturing step (a), in order to calculate the position information of the node;
wherein said applying the tip offset comprises:
obtaining relative coordinates of the node relative to the position data and orientation data of the sensing device, within an axis system defined by the sensing device; and
wherein the determining step (b)(i) further comprises evaluating an absolute position of the node in relation to the equipment.

23. A method according to claim 22, wherein the absolute position of the node is evaluated as follows:

$$M = \begin{vmatrix} CE & -CF & -D \\ -BDE+AF & BDF+AE & -BC \\ ADE+BF & -ADF+BE & AC \end{vmatrix}$$

where:
rotation matrix M=X.Y.Z where M is the final rotation; matrix, and X,Y,Z are individual rotation matrices;

A,B are the cosine and sine, respectively, of the X-axis rotation axis, i.e. roll;
C,D are the cosine and sine, respectively, of the Y-axis rotation axis, i.e. tilt;
E,F are the cosine and sine, respectively, of the Z-axis rotation axis, i.e. pan;

$$X_f = X_s + X_t*M(1,1) + Yt*M(2,1) + Zt*M(3,1);$$

$$Y_f = Y_s + X_t*M(1,2) + Yt*M(2,2) + Zt*M(3,2);$$

$$Z_f = 4 + X_t*M(1,3) + Yt*M(2,3) + Zt*M(3,3);$$

where:
$X_f, Y_f, Z_f$ are absolute (or "final") coordinates of the node;
$X_s, Y_s, Z_s$ are coordinates of the sensing device's center;
$X_t, Y_t, Z_t$ correspond to coordinates of the tip offset relative to the sensing device's center;
M(row,column) are elements of the rotation matrix in terms of row and column, respectively.

24. A method according to claim 22, wherein said applying the tip offset comprises obtaining a tip offset having been precalculated by measuring a position of a node sensing device located at a position of the node, in relation to a position and orientation of a base sensing device located at a position of said sensing device.

25. A method according to claim 24, wherein the initial orientation is defined as quaternion $Q_1$ with X, Y, Z, and W attributes, the orientation data of the capturing step is defined as $Q_2$, and wherein the position information of the node is determined according to:

$$P_n + (q_i q_n) P_i (q_i q_n)$$

where:
$P_i$ is the offset from the sensor at orientation q;
$P_n$ is the current position of the sensor;
$q_i$ is the orientation of the sensor at the time $P_i$ is calculated;
$q_n$ is the current orientation of the sensor; and
$q_i$ and $q_n$ are unit quaternions.

26. A method for controlling a setting of an equipment related to image capture, comprising:
 a) capturing three-dimensional position data and orientation data at a sensing device located at a first location on an object, the three-dimensional position data and orientation data representing a physical location and an orientation of the first location on the object;
 b) determining, by means of a processor, position information of a region of interest to be treated by the equipment from the position data and orientation data having been captured based on a predetermined positional offset of the region of interest from the first location on the object, the region of interest and the first location on the object being located at different locations; and
 c) outputting, via an output port of the processor, a control signal directed to the equipment, in order to control in real-time the setting of the equipment based on said position information of the region of interest; and
wherein the object is a human;
wherein the sensing device located at the first location is hidden on the body of the human; and
wherein the second location is a body part of the human being a facial feature of the human.

* * * * *